US006268936B1

United States Patent
Truc et al.

(10) Patent No.: US 6,268,936 B1
(45) Date of Patent: Jul. 31, 2001

(54) FILM SCANNER

(75) Inventors: James A. Truc, Eden Prairie; Doug Peterson, Minneapolis; James Anderson, St. Croix; Gregg J. Ovsak, Minneapolis; Rob McLean, Minneapolis; James A. Hogenson, Minneapolis; Bradley Johnson, Minneapolis; Dennis Deutsch, Hastings; Peter Wolter, New Brighton, all of MN (US)

(73) Assignee: Pakon, Inc., Minnetonka, MN (US)

( * ) Notice: Subject to any disclaimer, the term of this patent is extended or adjusted under 35 U.S.C. 154(b) by 0 days.

(21) Appl. No.: 09/137,889

(22) Filed: Aug. 21, 1998

Related U.S. Application Data

(62) Division of application No. 08/604,330, filed on Feb. 21, 1996, now Pat. No. 5,872,591.

(51) Int. Cl.[7] ....................................... H04N 1/04
(52) U.S. Cl. ...................... 358/487; 358/506; 358/498
(58) Field of Search ................................. 358/487, 506, 358/498; 348/96

(56) References Cited

U.S. PATENT DOCUMENTS

| | | | |
|---|---|---|---|
| 2,295,000 | 9/1942 | Morse | 348/96 |
| 4,390,357 | 6/1983 | Myers et al. | 65/435 |
| 4,482,924 | 11/1984 | Brownstein | 358/302 |
| 4,639,787 | 1/1987 | Isogai et al. | 348/96 |
| 5,010,410 | 4/1991 | Bernstein | 358/214 |
| 5,088,813 | 2/1992 | Wakefield | 352/183 |
| 5,091,963 | 2/1992 | Litt et al. | 382/199 |
| 5,157,482 | 10/1992 | Cosgrove | 348/97 |
| 5,282,036 | 1/1994 | Worley, Jr. et al. | 348/674 |
| 5,309,242 | 5/1994 | Asami et al. | 348/97 |
| 5,412,773 | 5/1995 | Carlucci et al. | 345/327 |
| 5,469,209 | 11/1995 | Gunday et al. | 348/96 |
| 5,541,644 | 7/1996 | Nanba | 348/96 |
| 5,565,912 | 10/1996 | Easterly et al. | 348/96 |
| 6,037,974 | * 3/2000 | Truc et al. | 348/96 |
| 6,100,924 | * 8/2000 | Truc et al. | 348/96 |

* cited by examiner

Primary Examiner—Cheukfan Lee
(74) Attorney, Agent, or Firm—Kinney & Lange, P.A.

(57) ABSTRACT

A photographic film scanner for scanning a film strip containing a plurality of photographic images is disclosed. The film strip is continuously advanced through the scanner and a digital image of the film strip is created. Individual images contained in the digital image of the film strip are located and displayed.

7 Claims, 21 Drawing Sheets

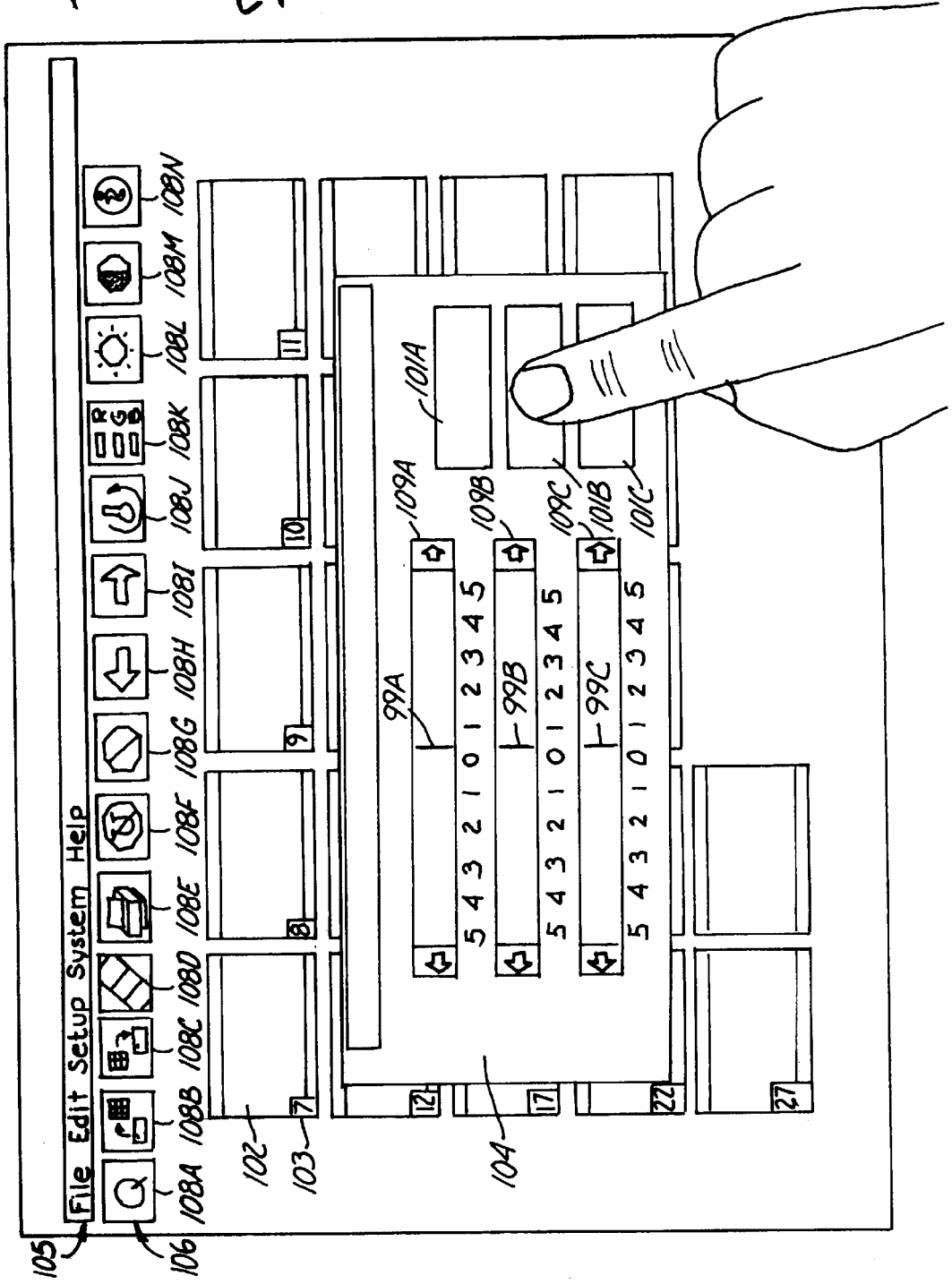

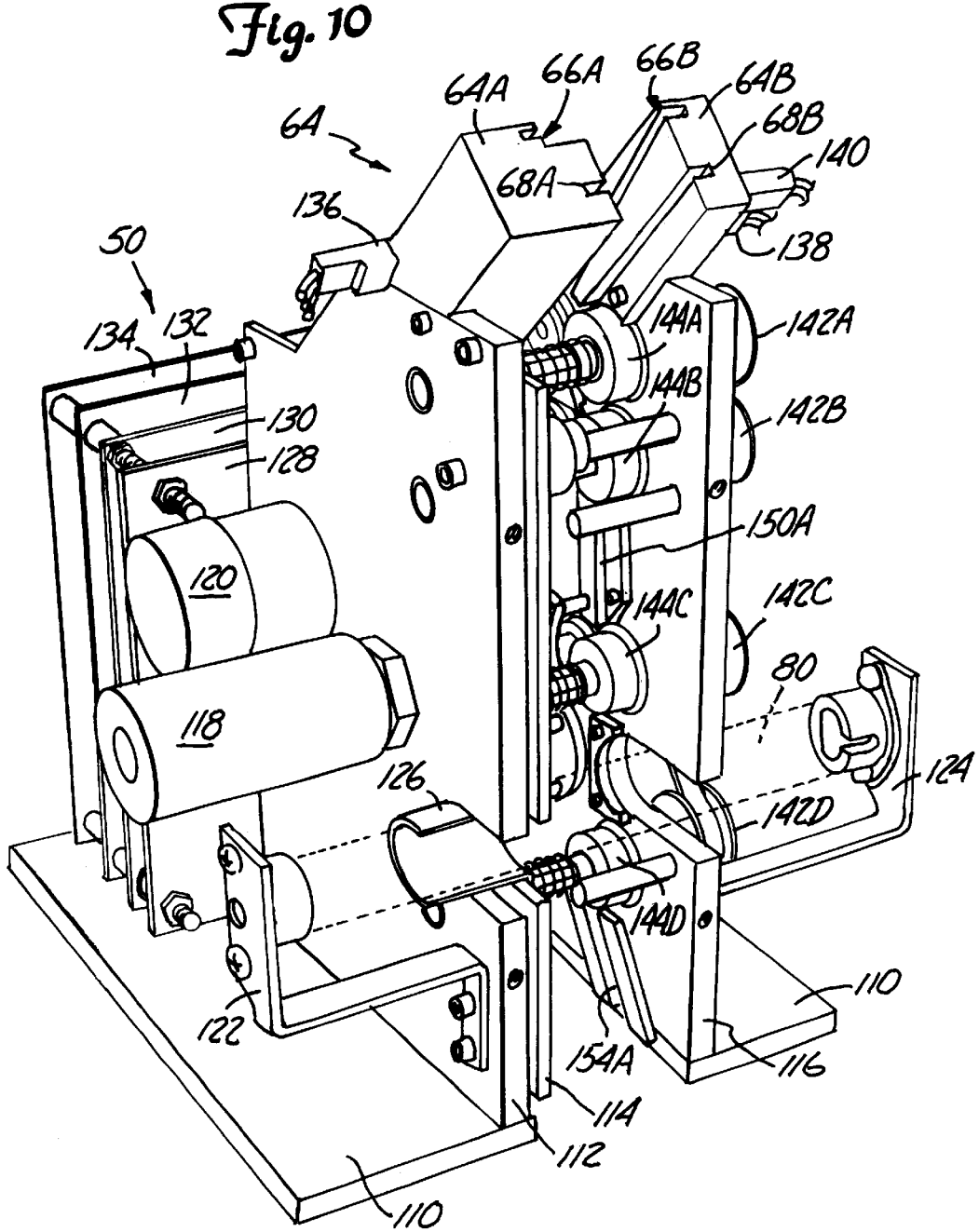

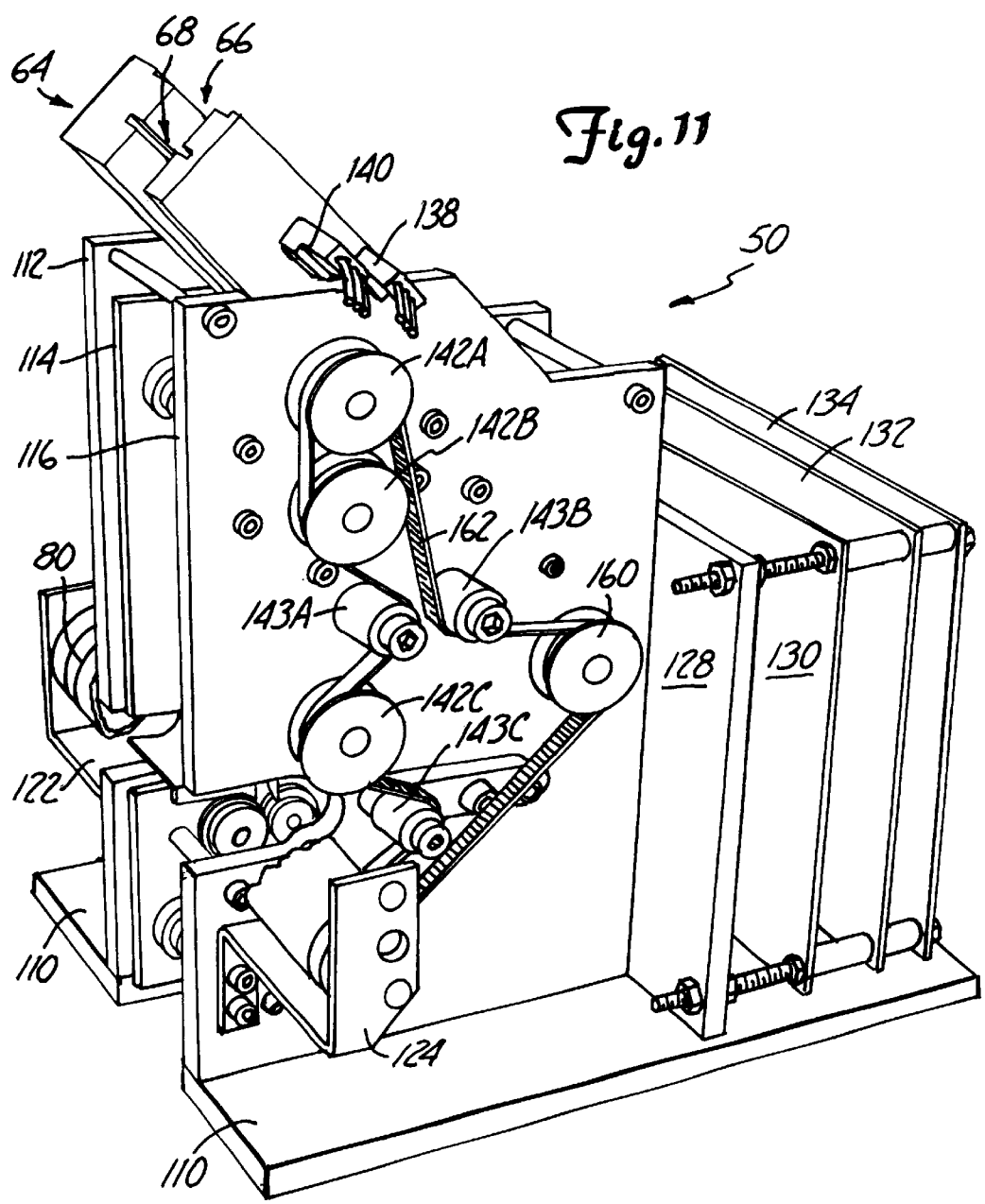

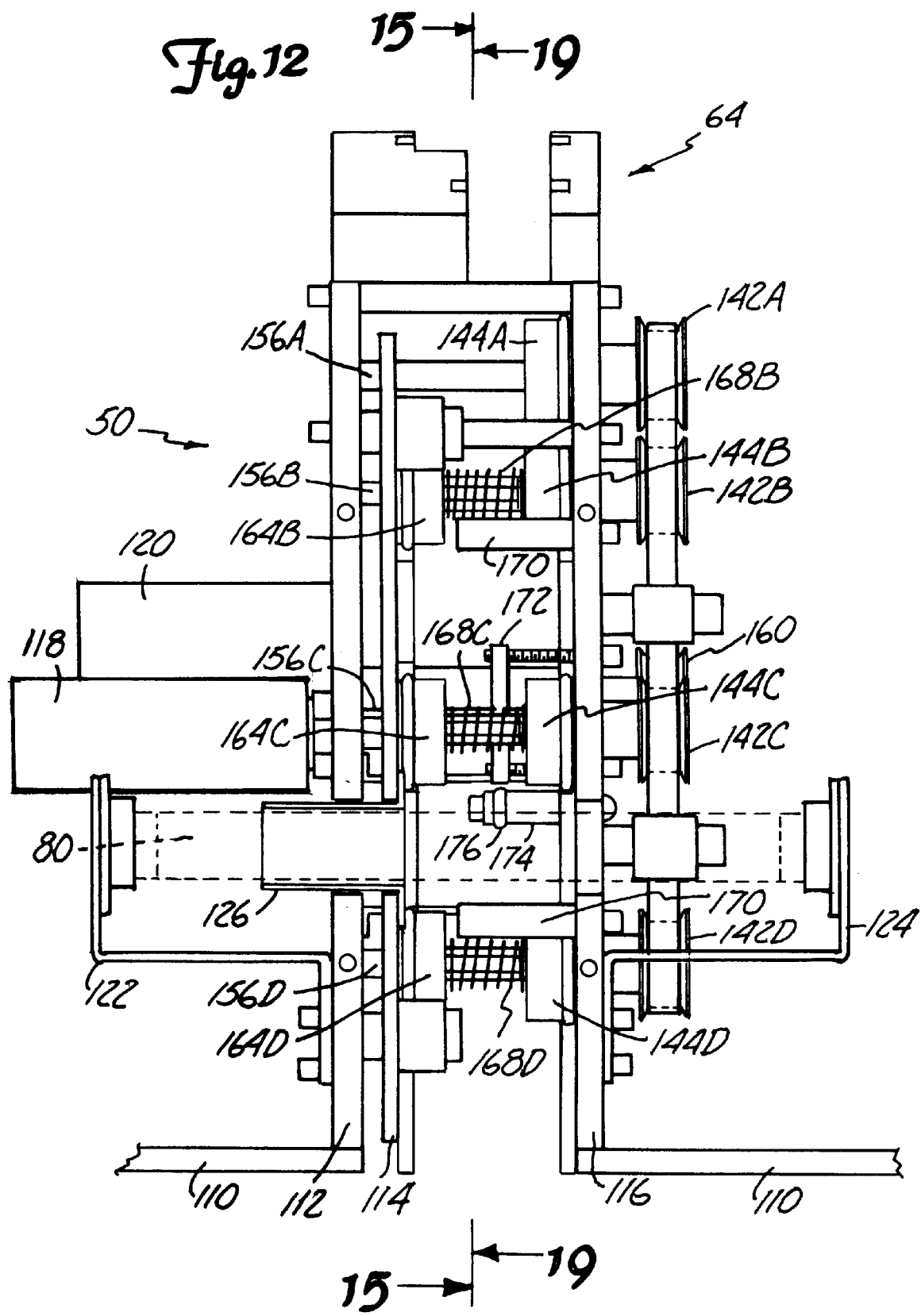

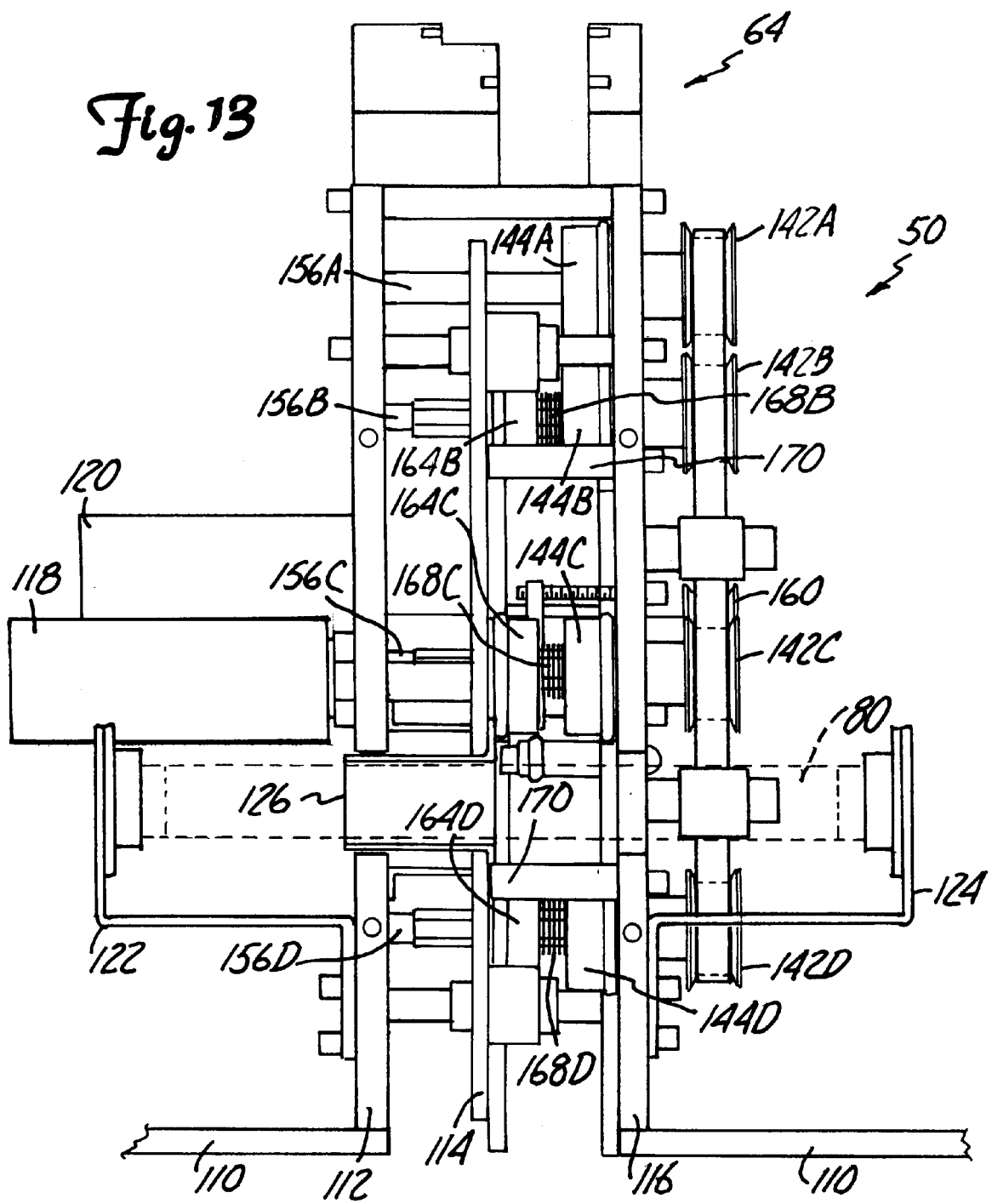

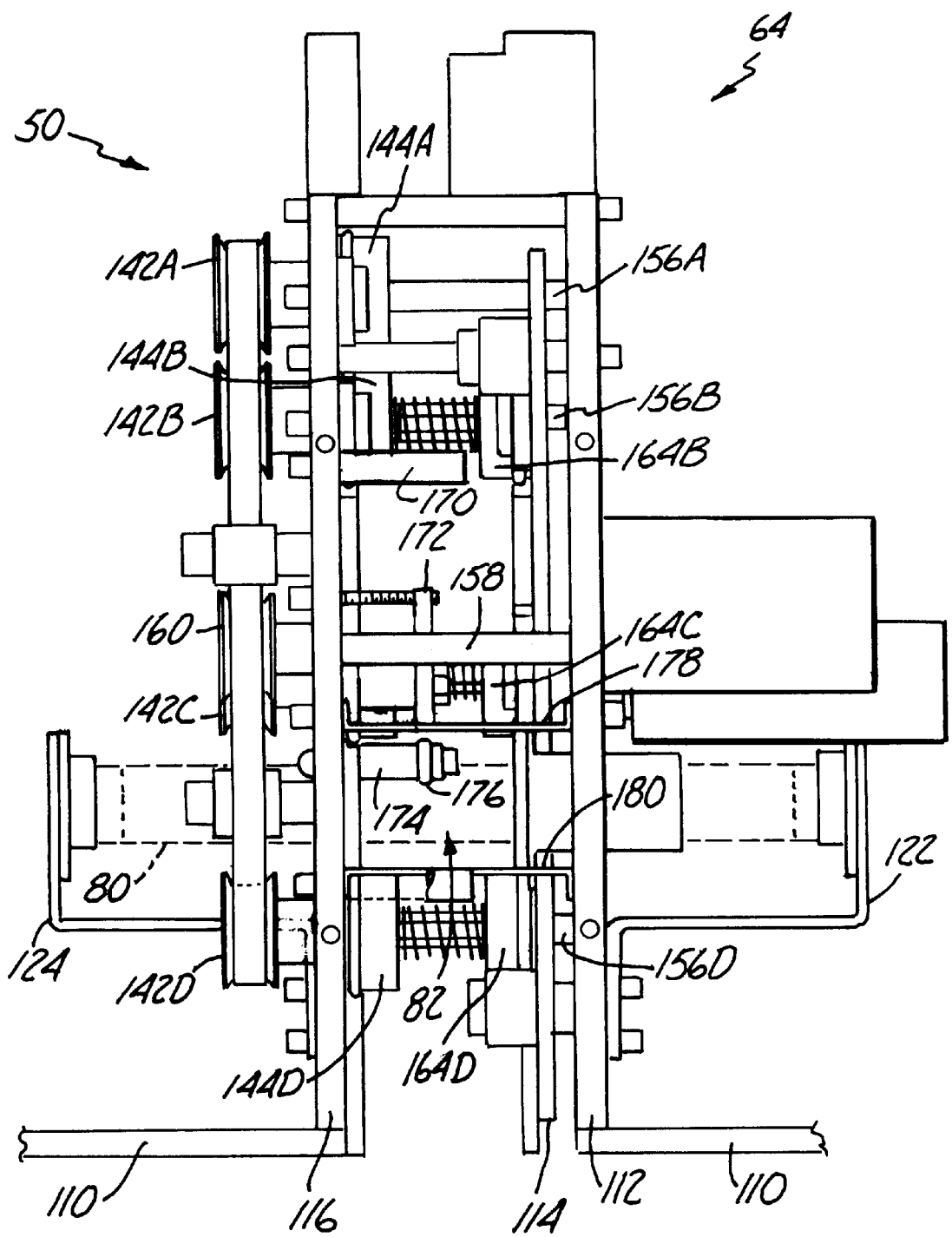

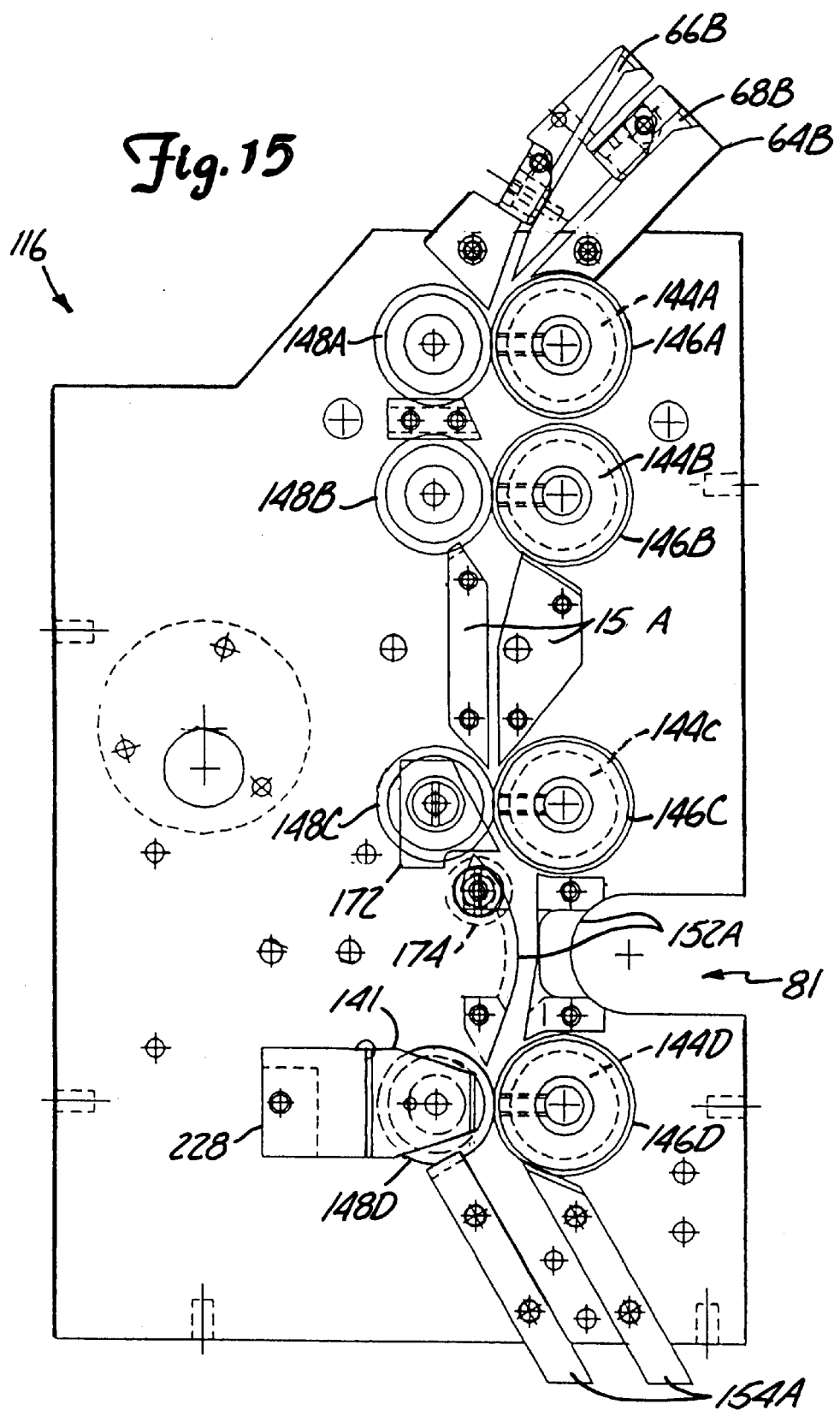

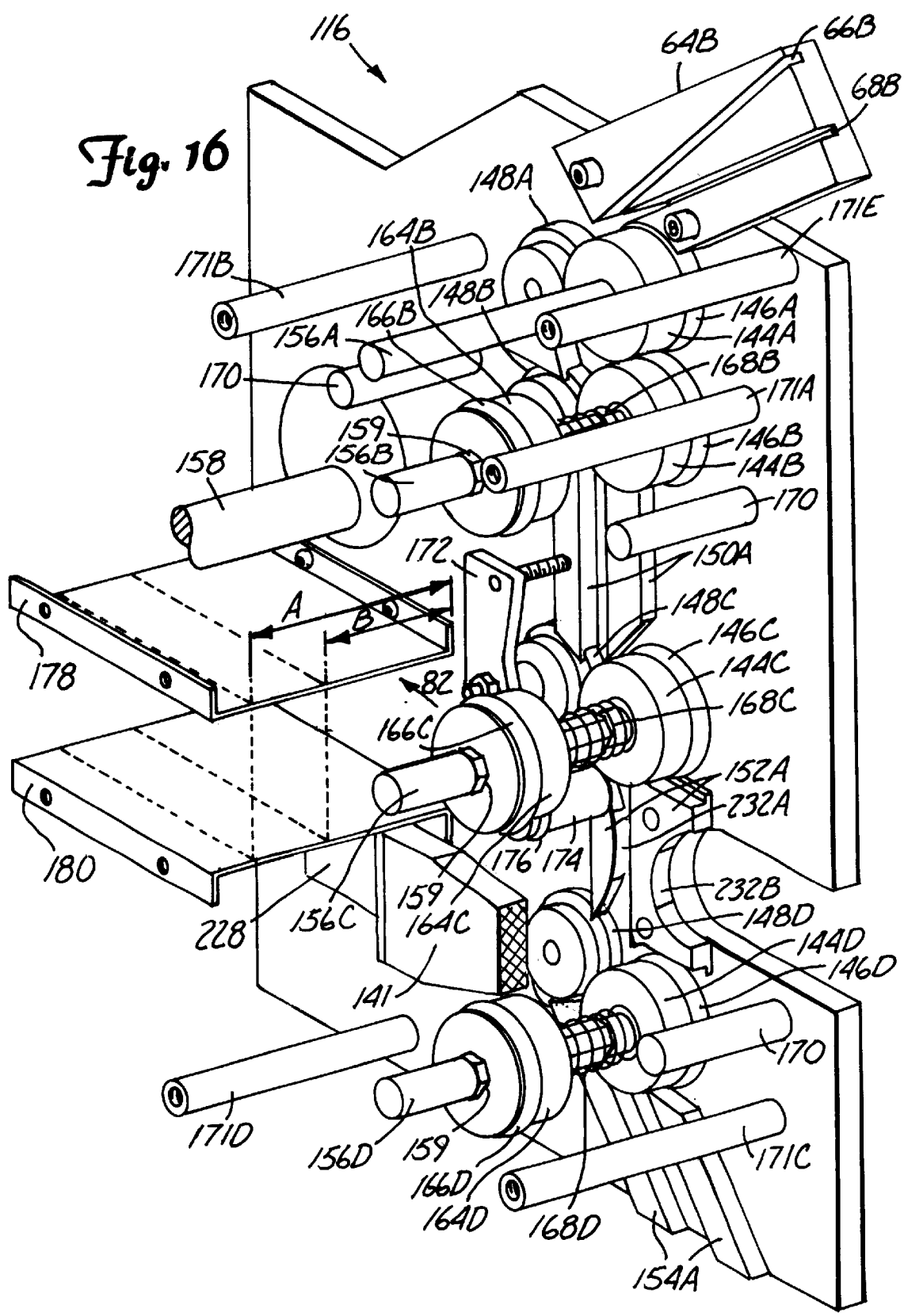

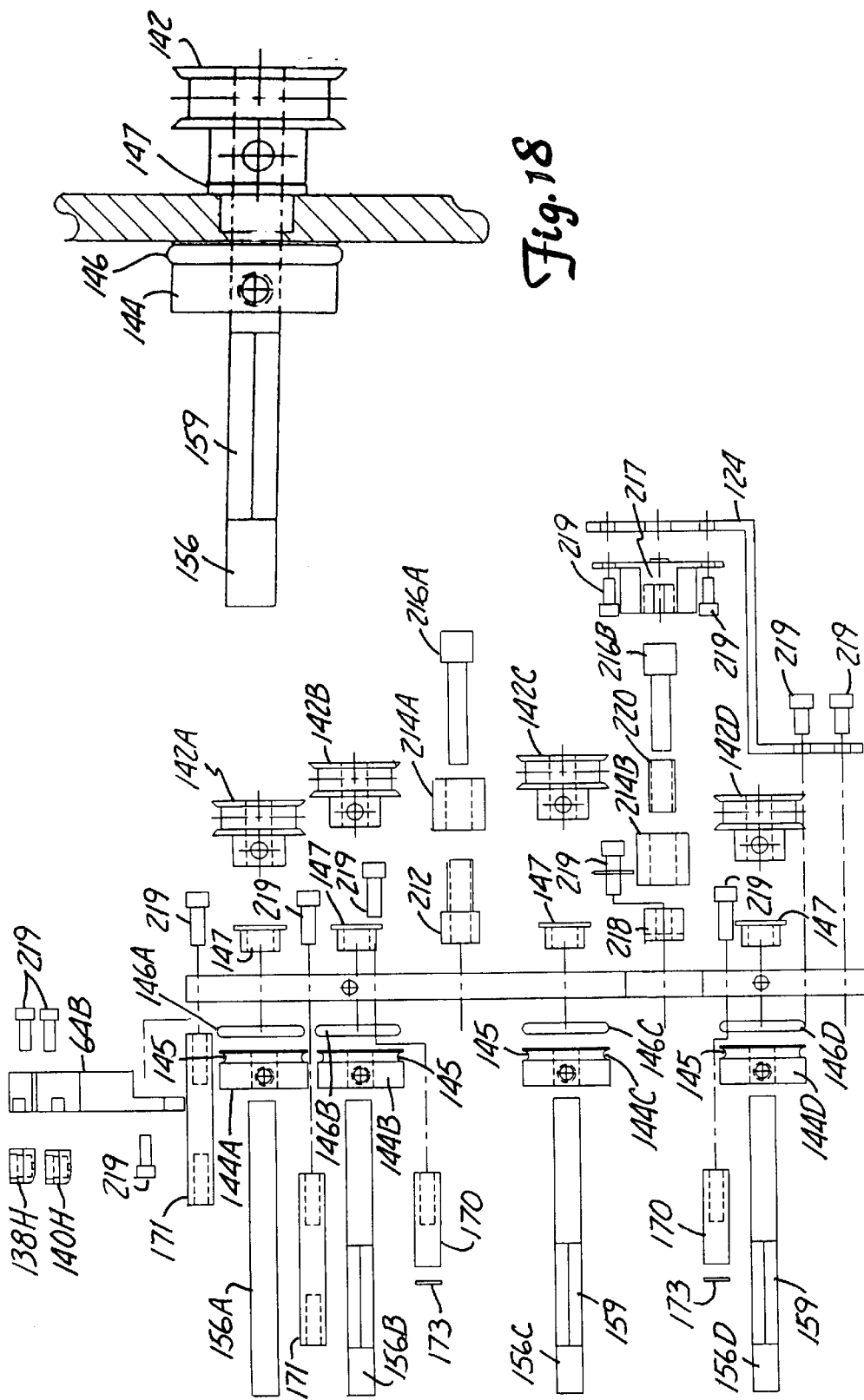

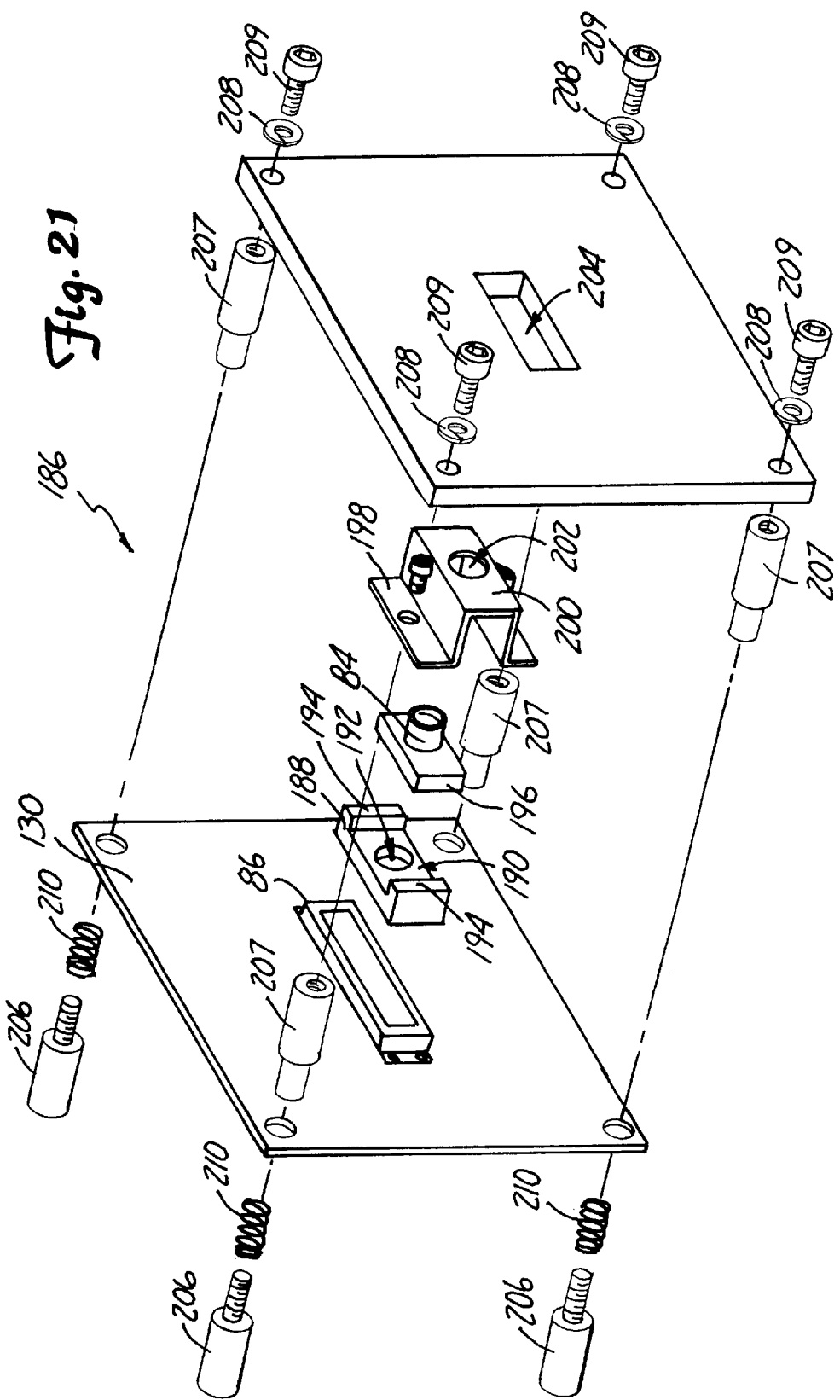

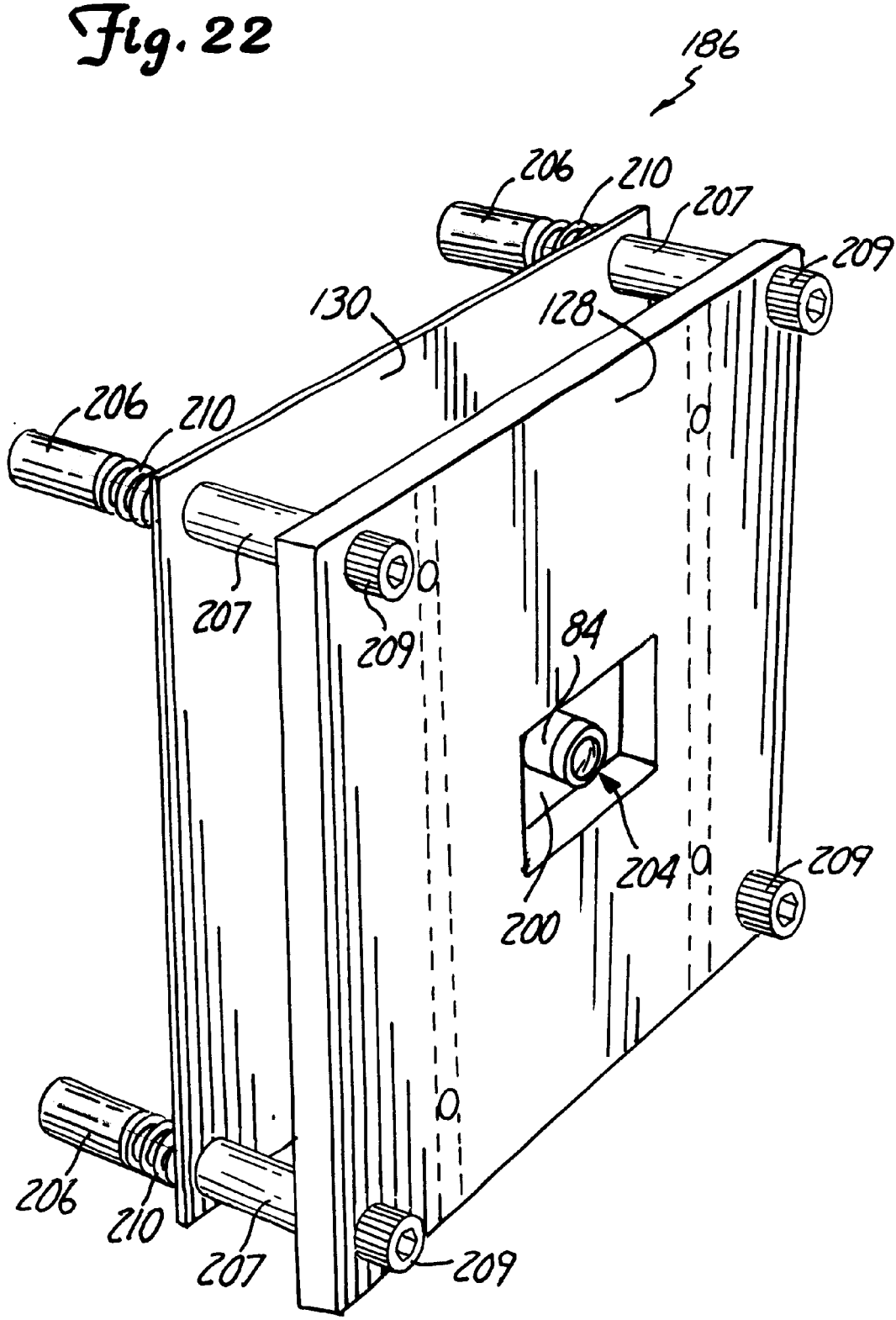

FILM SCANNER

CROSS REFERENCE TO RELATED APPLICATIONS

This application is a division of U.S. application Ser. No. 08/604,330, filed Feb. 21, 1996 is now U.S. Pat. No. 5,872,591.

BACKGROUND OF THE INVENTION

The present invention relates to an image scanning system, and particularly to a system which scans a strip of photographic film containing multiple images, and creates digital representations of those images.

Currently, scanning of photographic images is accomplished with flatbed scanners and drum scanners. With these scanners, only one image can be scanned at a time. If a new image is to be scanned, the old image must be physically removed from the scanner and replaced by the new image. One disadvantage to using such scanners is that it is a slow process to scan multiple images.

Other available scanners scan a roll of film by advancing the film until the first image is aligned with a scanning station, stopping and scanning the first image, advancing the film until the next image is aligned with the scanning station, stopping and scanning that image, and then continuing this process through the roll of film. Again, this is a slow process as the film must be stopped each time an image is scanned.

In addition to speed limitations, another disadvantage of prior art scanners is that they are typically limited to scanning only one type of film. With the variety of films that are available today, it would be useful to have a single scanner that can scan many types of film.

A further disadvantage of prior art scanners is the inability to efficiently locate previously scanned images and rescan them at a higher resolution. Typically, as the resolution increases, so does the time it takes to scan an image. Thus, it would be very advantageous to be able to quickly scan multiple images at a low resolution, and then after examining the digital representations of the images, locating and rescanning selected images at a higher resolution.

SUMMARY OF THE INVENTION

The image scanning system of the present invention scans a photographic film containing a plurality of photographic images and creates a corresponding plurality of digital representations of the photographic images. The system includes a touch screen monitor, a computer, a scanner and a printer.

The scanner has a light tunnel, and a light source for projecting light down the light tunnel. The scanner has a film drive for engaging a strip of film and continuously advancing it between the light source and the light tunnel. When the film comes between the light source and the light tunnel, light is projected through the film, thereby creating an image of the film which is projected down the light tunnel. A lens focuses the projected image of the film onto a light sensor. The light sensor receives the focused image of the film and outputs pixel data to a buffer. A computer takes the pixel data from the buffer and creates a digital image of the film.

After a digital image of the film is created, the computer finds individual images in the digital image of the film, converts these images into positive images, and color corrects the images. The positive color corrected images are then displayed on the monitor and may also be printed out.

In a preferred embodiment, the scanner is oriented vertically so that film is inserted through an inlet at the top of the scanner, and the film exits through an outlet at the bottom of the scanner.

Also in a preferred embodiment, the scanner has multiple inlet tracks to accommodate different type of films.

BRIEF DESCRIPTION OF THE DRAWINGS

FIG. 9 shows a user interacting with the touch screen monitor.

FIG. 10 is a perspective view of the left side of the scanner with the front and rear covers removed.

FIG. 11 is a perspective view of the right side of the scanner with the covers removed.

FIG. 12 is a front view of the scanner with the covers removed and the solenoid deenergized.

FIG. 13 is a front view of the scanner with the covers removed and the solenoid energized.

FIG. 14 shows the back side of the scanner with the back plate and circuit boards removed.

FIG. 15 shows the right side plate of the scanner viewed along section 15—15 of FIG. 12.

FIG. 16 shows a perspective view of the right side plate of the scanner.

FIG. 17 is an assembly drawing of the right side plate.

FIG. 18 shows an assembled pulley, shaft, and roller, used in the preferred embodiment.

FIG. 21 is an exploded perspective view of the lens assembly of the preferred embodiment.

FIG. 22 is a perspective view of a completed lens assembly.

DETAILED DESCRIPTION OF THE PREFERRED EMBODIMENTS

The image scanning system of the present invention scans a film strip and creates pixel data that is representative of the film strip. The system then performs various operations on the pixel data to obtain color-corrected, positive digital images which are displayed on a monitor. Thus, the scanning process will be discussed first to show how the scanner creates pixel data from a strip of film. Following the discussion of the scanning process is a discussion of the various operations performed on the pixel data which are needed to create color-corrected, positive digital images. The mechanical construction of the scanner is discussed third, followed by a description of the lens assembly. The detailed description concludes with a discussion of the adjustable resolution features, and the DX-code recognition features of the scanner.

I. The Scanning Process

Figure 1:
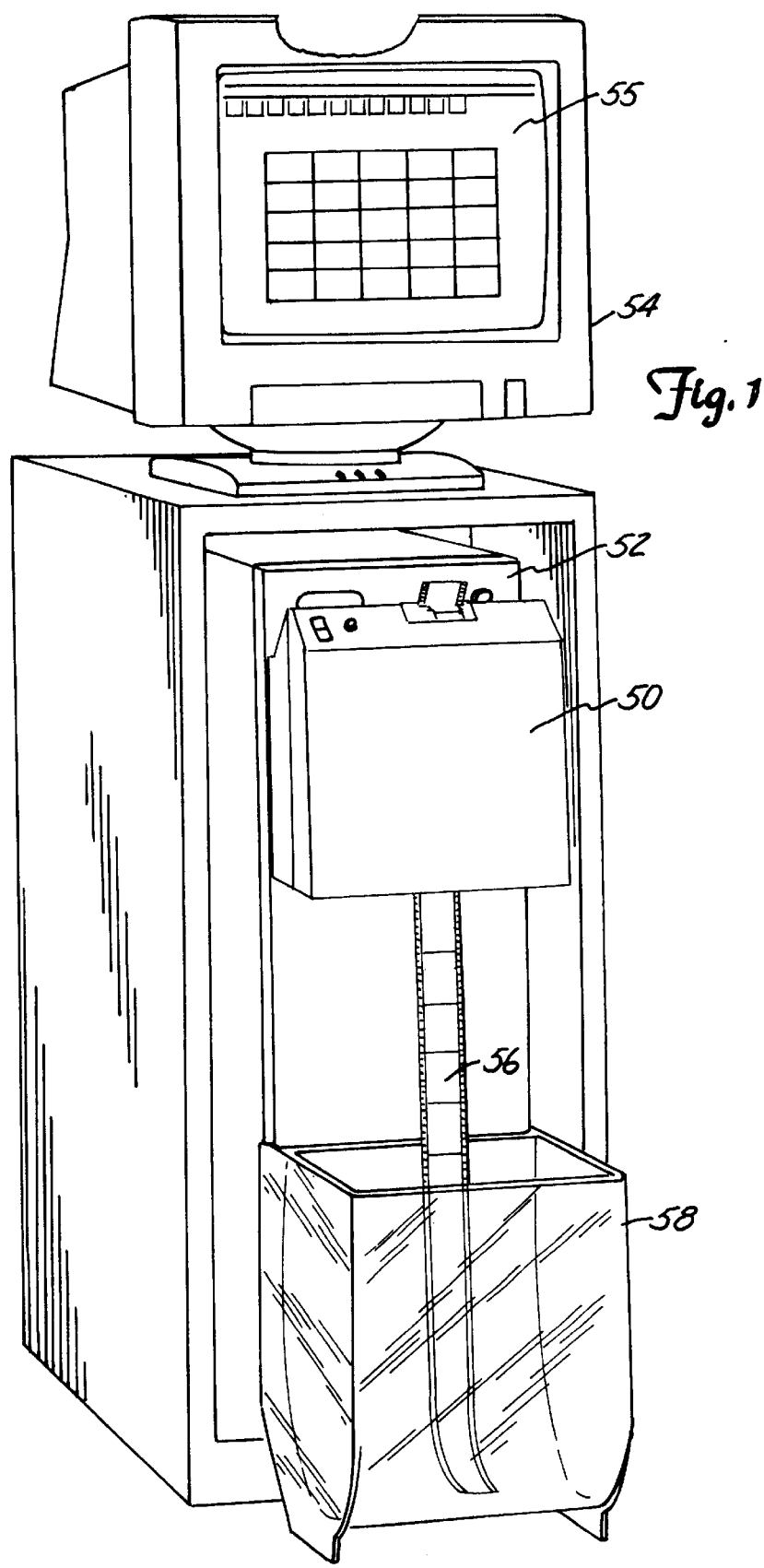
FIG. 1 shows the preferred embodiment of the image scanning system of the present invention.

FIG. 1 shows the image scanning system of the present invention. The system includes scanner 50, computer 52, and monitor 54. Monitor 54 is preferably an interactive touch screen monitor which allows commands to be input to computer 52 by touching screen 55. Alternatively, commands may be entered through keyboard 98 (shown in FIG. 4). Scanner 50 is mounted on a front face of computer 52. Film 56 is being scanned and when scanning is complete, film 56 will fall into basket 58. Film 56 can be any type of film including 35 mm film, APS film, black and white film, or a positive film such as E6 slide film. Also, film 56 can be either a complete roll of film, or a smaller strip of film such as one containing only three or four images.

Figure 2:
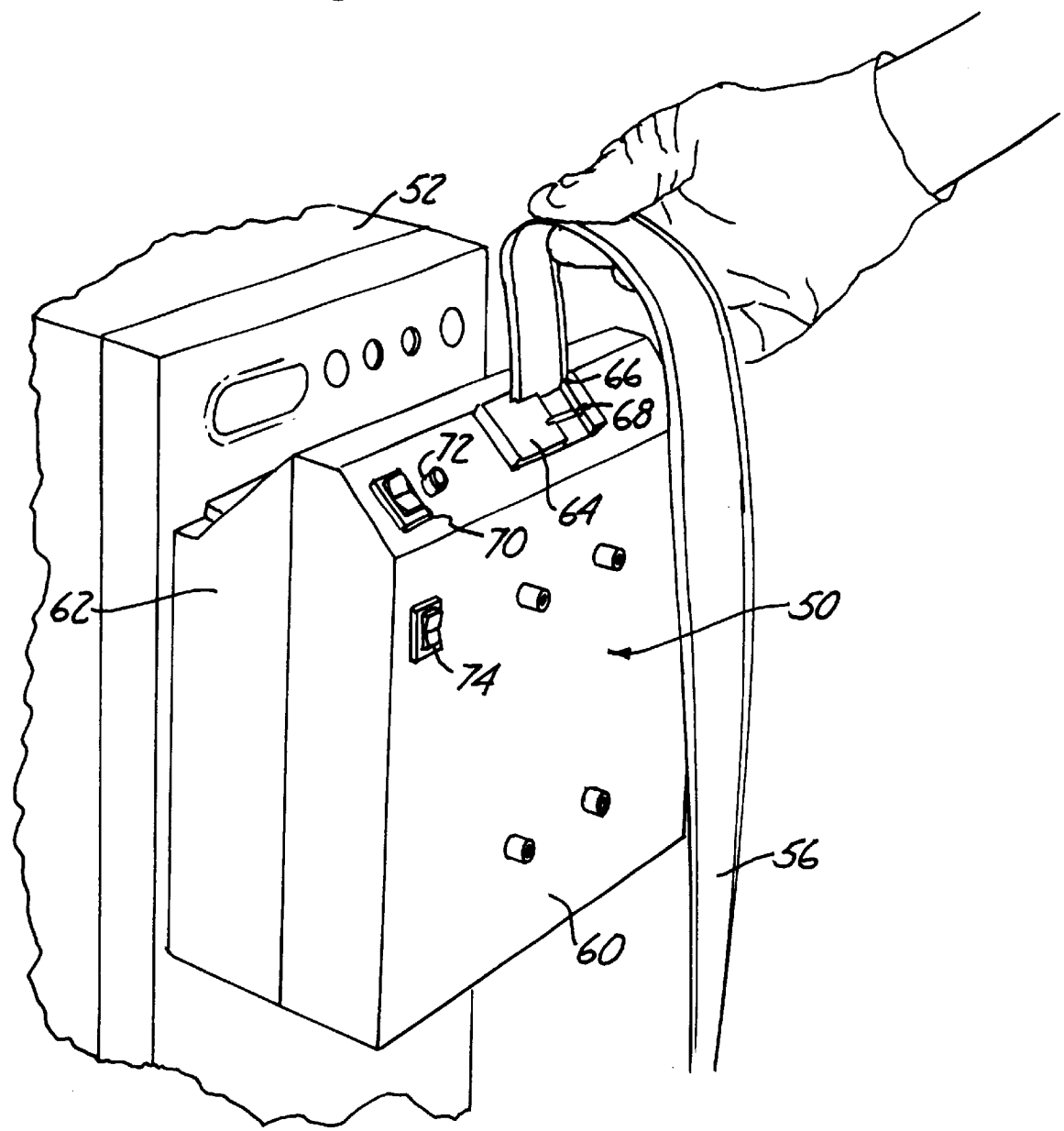
FIG. 2 is a perspective view of the scanner and computer used in the preferred embodiment which shows film being fed into the scanner.

FIG. 2 shows scanner 50 attached to computer 52. The scanner has front cover 60 and rear cover 62. Film loading platform 64 extends out from front cover 60 and has inlet tracks 66 and 68. Inlet track 66 of the scanner is for inserting 35 mm film, and inlet track 68 is for inserting APS film. On/stop switch 70 is used to turn the power of scanner 50 on and off. Film transport switch 74 controls the direction that film 56 is transported through scanner 50. Wait indicator light 72 indicates when scanner 50 is ready for film 56 to be inserted.

Figure 3:
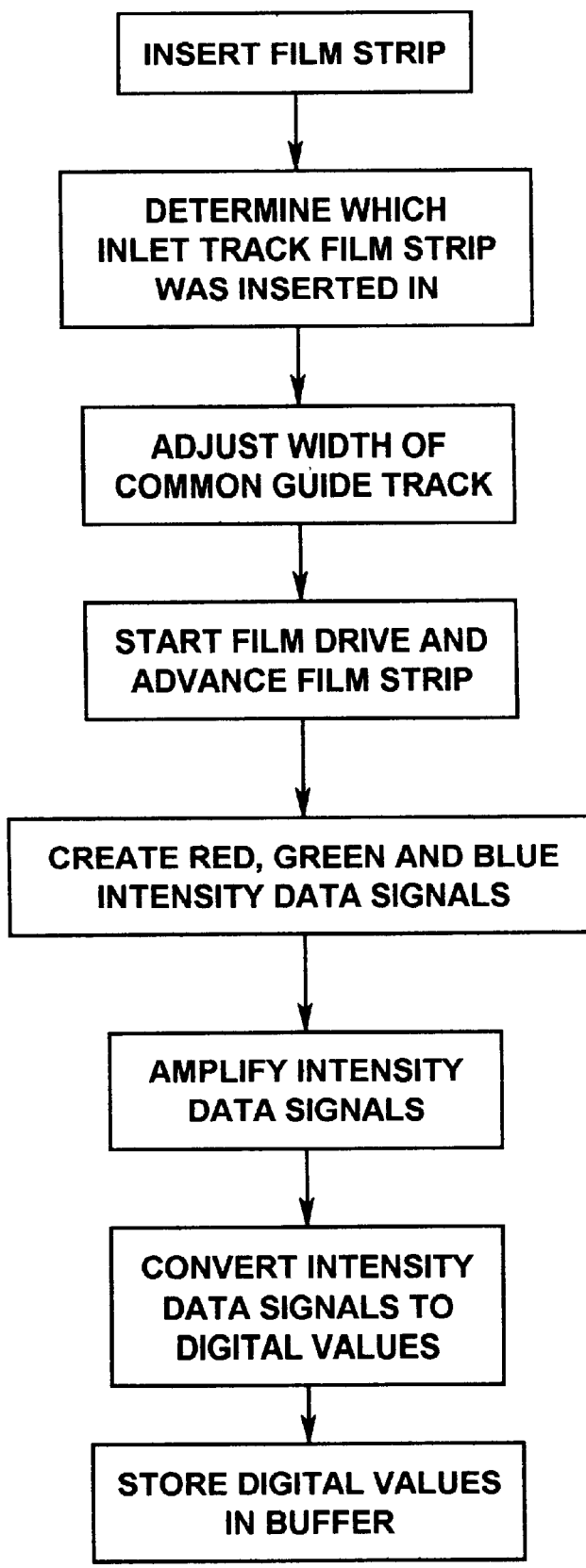
FIG. 3 is a flowchart of the functions performed by the scanner.

FIG. 3 shows a flowchart of the film scanning process. The first step in the process is to enter a strip of film into the scanner. The film is entered either in inlet track 66 or in inlet track 68 (both shown in FIG. 2). Optical sensors 136, 138, and 140 (shown in FIG. 10) detect which track the film was inserted. Inlet track 66 and inlet track 68 merge together at common guide track 76 (shown in FIG. 10 and FIG. 19). The common guide track consists of guides 150A, 152A, and 154A (shown in FIG. 10) that guide the right edge of the film, and guides 149, 150B, 152B, and 154B (shown in FIG. 19), that guide the left edge of the film. The width of the common guide track is electromechanically adjustable to accommodate films having different widths. If the optical sensors detect that 35 mm film has entered inlet track 66, a signal is sent to solenoid 118 (shown in FIG. 10) which responds by adjusting the width of the common guide track so that it is the same as the width of the 35 mm film. If the optical sensors detect that APS film was entered in inlet track 68, a signal is sent to the solenoid which responds by adjusting the width of the common guide track so that it is the same width as the APS film. Thus, the first three steps shown in the flowchart of FIG. 3 have been completed. The remainder of the steps will be discussed with reference to FIG. 4.

Figure 4:
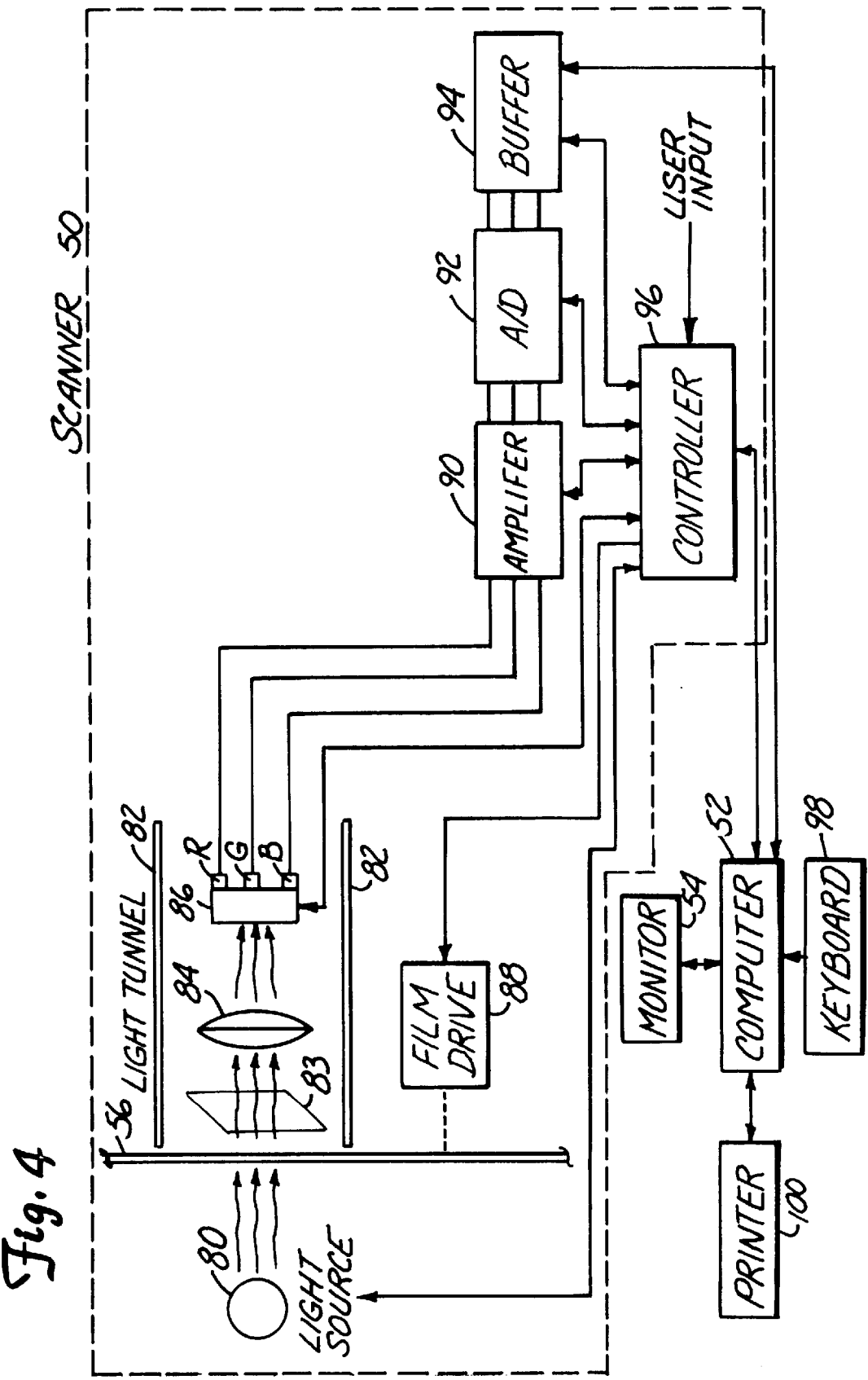
FIG. 4 is a block diagram of the image scanning system.

FIG. 4 shows a block diagram of the scanning system. The scanning system includes scanner 50, computer 52, monitor 54, keyboard 98, and printer 100. Scanner 50 includes light source 80, light tunnel 82, lens 84, light sensor 86, film drive 88, amplifier 90, analog-to-digital (A/D) converter 92, buffer 94 and controller 96. After the width of the common guide track has been adjusted, film drive 88 engages the film strip and advances it through the scanner. As the film is advanced through the scanner, it passes between a light source 80 and a light tunnel 82 (both shown in FIG. 14 also). Light source 80 projects light through film 56 and down light tunnel 82. Film 56 is continuously advanced in front of the light tunnel at a substantially constant velocity by film drive 88. The light projected through film 56 creates film image 83. Lens 84 focuses film image 83 onto light sensor 86. Light sensor 86 and lens 84 make up a part of lens assembly 186 shown in FIG. 21. Preferably, light sensor 86 is a Kodak KLI-2103 image sensor.

Light sensor 86 has three parallel linear photodiode arrays. Each linear photodiode array consists of 2,098 photosites. Depending on the lens used, film image 83 can be focused on all 2098 of the photosites of each array, or any subset of the photosites, such as the 300 in the middle of each array. One array is covered with a red filter stripe, the second array is covered with a green filter stripe, and the third array is covered with a blue filter stripe. Each photosite covered by a red filter stripe will output a signal that varies according to the intensity of red light incident on that photo site. Similarly, each photosite covered by a green or blue filter stripe will output a signal that varies according to the intensity of green or blue light, respectively, incident on the photosite. Each photosite has a charge coupled device (CCD) that produces the signal for that photosite. The amplitude of the signal for each photo site builds up during a specified integration period, and at the end of that period, the signals are output to CCD registers. There is a separate CCD register for each array of photosites. Thus, each CCD register holds intensity data for a single color. Light sensor 86 has three outputs to output the intensity data stored in the CCD registers. In FIG. 4 the three outputs for light sensor 86 are marked R, G, and B, which signify red intensity data, green intensity data, and blue intensity data, respectively. As film 56 is advanced in front of the light tunnel, film image 83 10 changes and new red, green, and blue intensity data is output from the light sensor.

In operation, the scanner essentially divides film image 83 into a matrix of pixels. As the film advances, the first row of pixels of the film image passes the first array of photosites of the light sensor, and the red intensity data for each pixel in the first row is obtained. As the film advances further, the first row of pixels of the film image passes the second array of photosites of the light sensor, and the green intensity data for each pixel in the first row is obtained. As the film advances further, the first row of pixels of the film image passes the third array of photosites of the light sensor, and the blue intensity data for each pixel in the first row is obtained. This process applies to each row of pixels of the film image so that, when scanning is complete, red, green, and blue intensity data has been obtained for each pixel in the matrix.

The red, green, and blue intensity data coming from light sensor 86 is amplified by amplifier 90. Amplifier 90 is actually three separate amplifiers, one for each intensity data signal coming from the light sensor. Amplifier 90 is preferably located on circuit board 130 (shown in FIG. 10). After amplification, the red, green, and blue intensity data signals are converted to digital values by A/D converter 92. These digital values are then stored in buffer 94. A/D converter 92 and buffer 94 are preferably located on circuit board 132 (shown in FIG. 10).

Controller 96 controls the advancement of film 56 by sending control signals to film drive 88. The controller also controls the operation of light sensor 86 and light source 80. Any input signals initiated by a user, such as using on/stop switch 70 or film transport switch 74 (both shown in FIG. 2), will be interpreted by the controller and appropriate control signals will be output. The controller is preferably located on circuit board 134 (shown in FIG. 10).

II. Image Data Manipulation and Image Display

Figure 5:
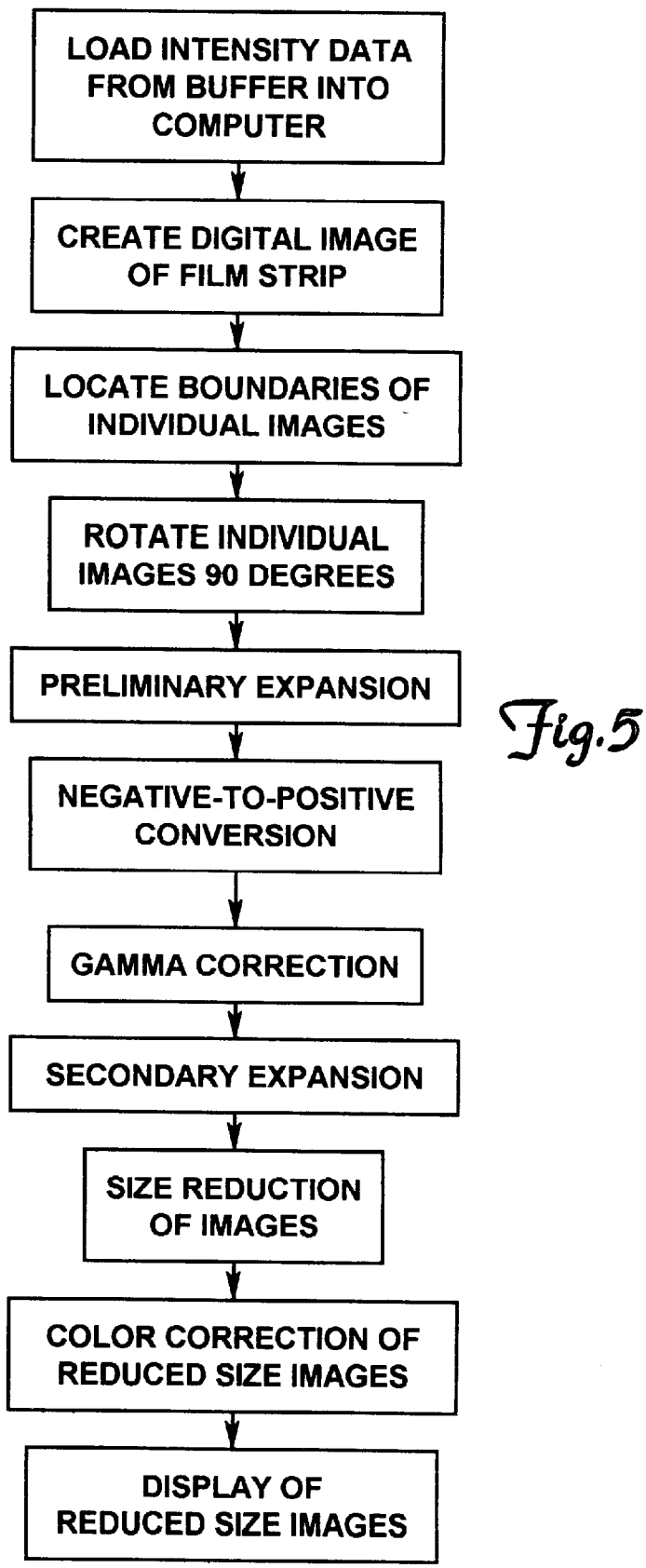
FIG. 5 is a flowchart of the operations performed by the computer on the image data.

After the intensity data for a film strip is stored in buffer 94, computer 52 performs a series of operations on the intensity data. FIG. 5 shows a flowchart of the computer operations performed on the intensity data. After scanning is complete, the intensity data stored in buffer 94 is loaded into RAM of computer 52. Computer 52 organizes the intensity data and creates a digital image of the entire film strip. The digital image of the film strip is not displayed, but the data for the image is analyzed to locate individual images.

Individual images are extracted from the digital image of the film strip by first finding the boundaries between individual images. When individual images on the film are created, varying densities of silver are deposited on a substrate layer. In the area between images, there is only the substrate layer with no silver deposits. Thus, when light is projected through the film, the light going through the area between the images will have a high intensity because there are no silver deposits to block the light. These boundaries between individual images are determined, then, by calculating the average intensity of each row of pixels in the digital image of the film strip. A high average intensity will indicate that the row is a film boundary. In addition, since the boundaries occur at regularly spaced intervals, the location of each boundary is compared to the locations of earlier boundaries and later boundaries, to ensure that the boundary is in fact a boundary and not a portion of an image that was unexposed.

In addition to the boundaries between images (which are the left and right boundaries of the images), the top and bottom boundaries of the images must also be found. The location of the top and bottom boundaries indicates what type of image is present. For example, in a panoramic image, the top and bottom boundaries will be closer together than a normal image. The top and bottom boundaries are found using a process similar to that used in finding the boundaries between images. To find the top and bottom boundaries, the average intensity of each column of pixels in each digital image is calculated. A high average intensity indicates that the column is a boundary.

After the individual images are located, a separate data set is created for each image, and each image is then rotated 90 degrees. The rotation is necessary because when an image is scanned, it is scanned from one side of the image to the other, rather than from the top of the image to the bottom. Thus, the first row of pixels in the data set for each image will represent a left or right edge of the image rather than the top of the image. In order to display the image upright, the first row must be changed to the first column, the second row to the second column, etc., until the last row is changed to the last column.

After the individual images are located and rotated, the image data is analyzed to determine what color corrections are needed. The color correction analysis is a four step process. The first step in the color correction analysis is a preliminary expansion, the second is a negative-to-positive conversion, the third is a gamma correction, and the fourth is a secondary expansion. The order of the steps in the color correction analysis can be changed. Color correction data is created and stored during the color correction analysis, but color corrections are not actually made to the image data until the images are either displayed on the monitor or printed out.

The first step in the color correction analysis is a preliminary expansion. Each image is made up of a series of pixels with each pixel having three intensity values (red, green, and blue) associated with it. Each intensity value can range from "0" to "255", but will typically be found somewhere near the middle of this range. The intensity values for all pixels in all images are examined to find the lowest intensity value for each color, and the highest intensity value for each color. This color correction data is then stored. When it is time to make the color correction, the range of intensity values for each color is expanded by mapping the lowest intensity value to "0", the highest intensity value to "255", and linearly mapping all other values between "0" and "255". For example, if the lowest red intensity value were "100" and the highest red intensity value were "200", "100" would be change to "0", and "200" would be changed to "255". If there were a red intensity value of "150", it would be changed to "127". Similarly, all other values in the range "100" to "200" would be linearly mapped to the range "0" to "255".

After the preliminary expansion, the next step in the color correction analysis is a negative-to-positive conversion. This conversion involves creating three sets of positive intensity data from the three sets of negative intensity data. Each intensity value ranges from "0" to "255". To convert a negative intensity value to a positive intensity value, the value is simply shifted from one end of the range to the other. For example, if a red negative intensity value were "0", this would be shifted to the other end of the range which would be "255". Each intensity value is shifted, then, according to the equation, P=255−N, where P represents a positive intensity value and N represents a negative intensity value. If a positive film such as E6 slide film is being scanned, the negative-to-positive conversion is not performed.

Figure 6:
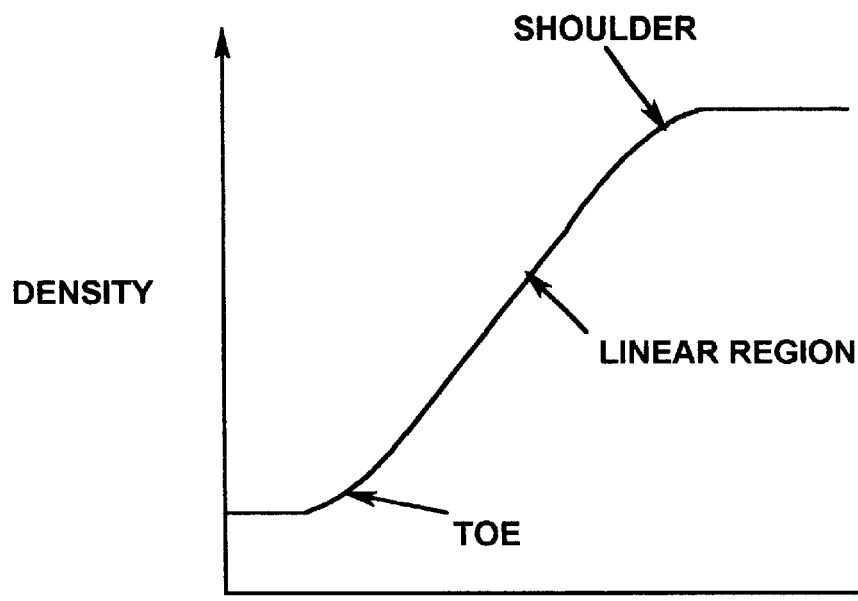
FIG. 6 is a graph of a typical D log E curve for a film.
Figure 7:
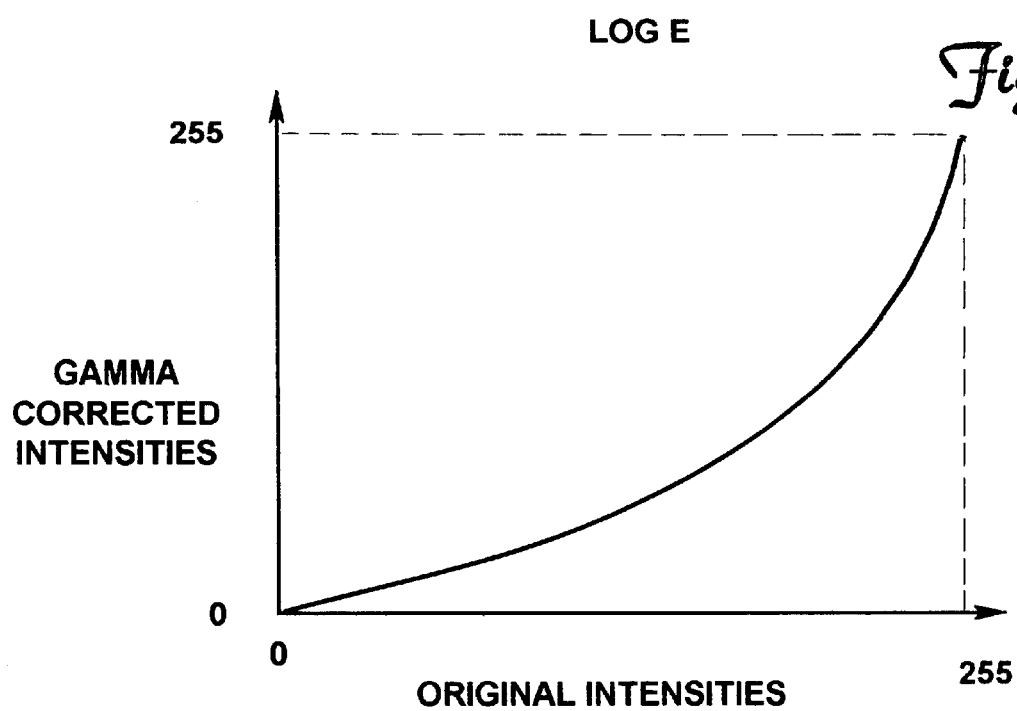
FIG. 7 is a graph of a gamma correction curve.

The third step in the color correction analysis is a gamma correction. The exposure (E) to which film is subjected is defined as the incident intensity (I) multiplied by the exposure time (T). A popular way to describe the photosensitive properties of photographic film is to plot the density (D) of silver deposited on a film versus the logarithm of E. Such a curve is called a characteristic curve or a "D log E" curve of a film. An example of a typical D log E curve for a photographic negative is shown in FIG. 6. As can be seen from FIG. 6, as E increases, so does the density of silver deposited. However, D peaks at the shoulder region and a further increase in E will not increase D. Similarly, at low values of E, D remains essentially constant until E reaches the toe region, at which point D begins to increase. The region of the curve between the toe and the shoulder is linear, and the slope of this portion of the curve is commonly referred to as "gamma." The greater the value of gamma, the higher the contrast of the film. Since there is nonlinear relation between density and exposure, the intensity data must be adjusted to compensate for this nonlinearity. This adjustment is called a gamma correction. In the present invention, there are three gamma corrections calculated. One gamma correction is calculated for each set of intensity data (red, green, and blue). The gamma correction is simply a mapping of the intensity data according to the gamma correction curve shown in FIG. 7. The horizontal axis of the curve represents the range of original intensity values, and the vertical axis represents what the original values are mapped to (i.e., the gamma corrected intensity values). Since the value of gamma tends to vary from film to film, a different gamma correction curve may be used for each type of film. Alternatively, a gamma correction curve can be generated using a typical or average value of gamma, and the same curve can be used for all types of film.

The final step in the color correction analysis is a secondary expansion. The secondary expansion is essentially the same process as the preliminary expansion except that the process is performed on each individual image separately rather than all images together. The secondary expansion involves finding, in each image, the lowest and the highest intensity values of each of the three colors. The lowest value for each color is mapped to "0", the highest value is mapped to "255", and all other values are linearly mapped between "0" and "255".

After the color correction data is obtained in the color correction analysis, each image is reduced in size, the color correction data is used to perform a color correction on the reduced images, and the reduced images are then displayed on the monitor along with their corresponding frame numbers.

If the film that is scanned is black and white film, an additional step must be performed prior to display of the images. The three sets of intensity data must be converted to a single set of intensity data, with the single set of intensity data representing varying levels of gray in the film image.

Once the reduced images are displayed on the monitor, various changes can be made to the images such as changes in contrast, color and intensity. If changes are made to the reduced images, these changes are stored so that the changes can later be applied to the full size images. When the desired changes have been made to the reduced images, they may be printed out to printer 100 (shown in FIG. 4). The full size images may also be displayed or printed out. Prior to displaying or printing out the full size images, the stored color corrections are applied to the image data.

Figure 8:
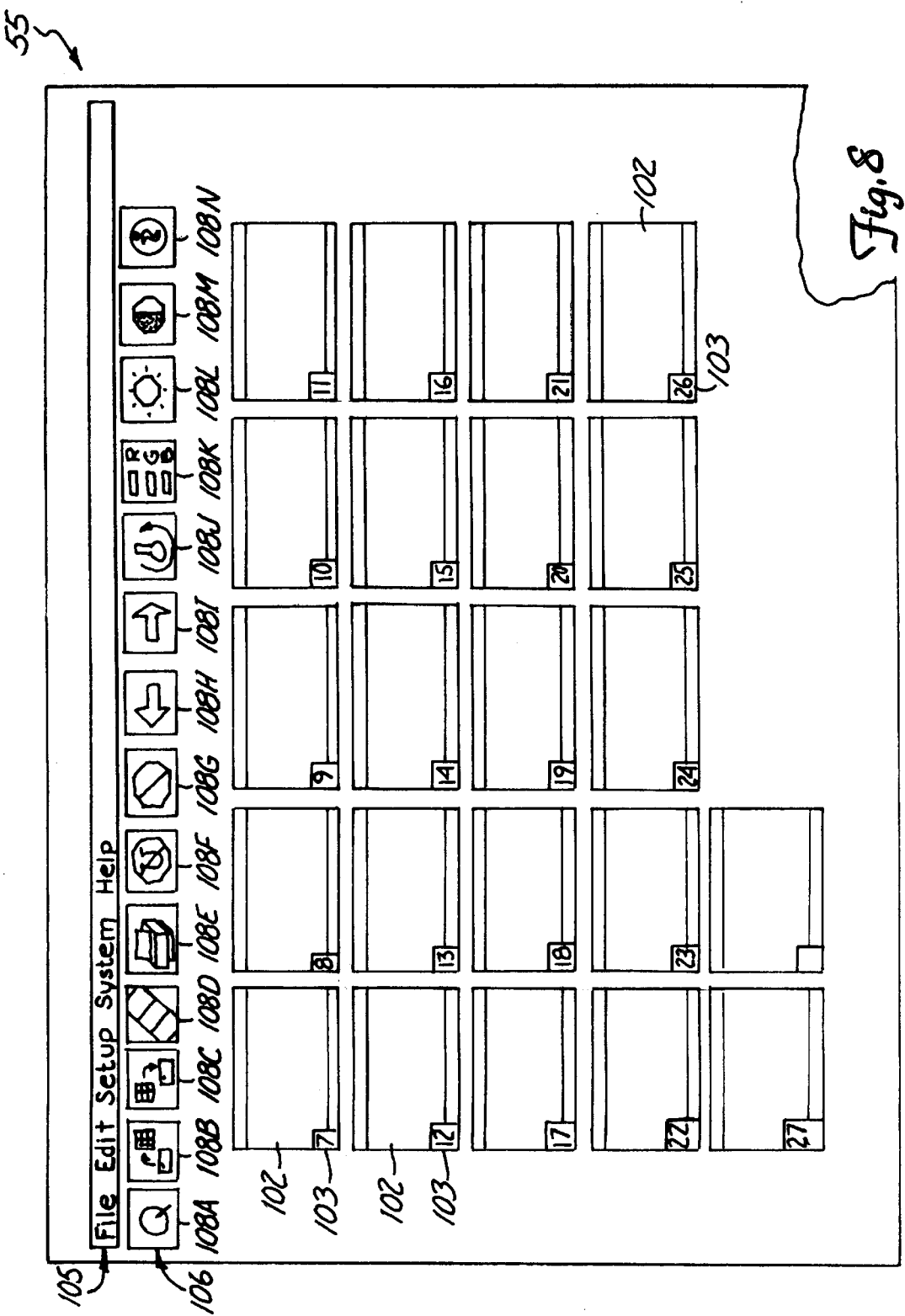
FIG. 8 shows digital images being displayed on the interactive touch screen monitor used in the preferred embodiment.

FIG. 8 shows screen 55 of monitor 54 displaying various digital images 102 which represent photographic images scanned from a strip of film. Frame numbers 103 are displayed along with images 102 to facilitate the location of the corresponding negatives on the film strip. Menu bar 105 and menu bar 106 are displayed on screen 55. Menu bar 105 includes five pull-down menus labeled "File", "Edit", "Setup", "System", and "Help". When a user touches one of the pull-down menus, a series of menu items (not shown) appears on screen 55. A menu item may be selected by touching that item. The menu items allow a user to perform a variety of modifications on images 102. For example, a user can modify the color, brightness, contrast, and orientation of the images. A user can also delete images, save images to a disk, and print images.

Some of the more frequently used menu items are represented by icons 108A through 108N (collectively referred to as icons 108) in menu bar 106. Thus, a user may select a menu item by touching the icon 108 that represents the menu item. Icon 108A represents a "Scanning Information" menu item that allows a user to specify the starting frame number of the images, and the orientation of the film when it is entered into the scanner. The Scanning Information menu item also includes an option to begin scanning. Icon 108B represents a "Retrieve" menu item that allows a user to retrieve and display previously stored images. Icon 108C represents a "Save" menu item that allows a user to save images 102 to a disk. Icon 108D represents a "Format" menu item that allows a user to specify the format of the film that is to be scanned. For example, a user may specify that the film is a full length film, or that the film is divided into multiple strips. Icon 108E represents a "Print" menu item that allows a user to print images 102 in a variety of formats such as on an envelope, on an index sheet, and on a sleeve that holds the negatives. Icon 108F represents an "Undelete" menu item that allows a user to redisplay an image that was previously deleted. Icon 108G represents a "Delete" menu item that allows a user to delete selected images. An image is selected for deletion by touching the image. Icon 108H represents a "Left Border" menu item that allows a user to change the position of the left border of selected images. Icon 108I represents a "Right Border" menu item that allows a user to change the position of the right border of selected images. Icon 108J represents a "Rotate Images" menu item that allows a user to rotate the images. Icon 108K represents a "Color" menu item that allows a user to change the red, green, and blue intensity level of selected images. Icon 108L represents a "Brightness" menu item that allows a user to modify the brightness of selected images. Icon 108M represents a "Contrast" menu item that allows a user to modify the contrast of selected images. Icon 108N represents an "About" menu item that displays information about the scanning system.

If a user touches icon 108D and then selects multiple strips, the film drive will continue to operate for a short period of time after a strip is scanned in order to facilitate the loading of multiple strips. As long as another film strip is loaded during this period of time, the film drive will continue to operate. If a film strip is not inserted within this time period, the film drive will stop. When photographic film is scanned in multiple strips, the images from each strip can be displayed together (as shown in FIG. 8) as if the images were scanned from a single roll of film. Also, the image data from each strip can be combined to calculate color corrections that require image data from the entire film. For example, when doing a preliminary expansion, the lowest and highest intensity values for the entire film image are determined. If multiple strips are scanned, the image data from each strip is combined to determine the lowest and the highest intensity values overall. Also, the same gamma correction would be applied to all images that came from the same film even though the images were entered in separate strips.

FIG. 9 shows a user interacting with screen 55 of monitor 54. Whenever a user touches one of the icons 108, a window will typically appear which allows a user to input information. Window 104 is displayed as a result of the user pushing icon 108K, which represents a "Color" menu item. Similar windows appear when other icons are pressed. A user can input information in window 104 to change the red, green, and blue intensity of selected images. Window 104 has three slide bars 109A, 109B, 109C, three markers 99A, 99B, and 99C, and three buttons 101A, 101B, and 101C. The red intensity of selected images can be modified by moving marker 99A left or right along slide bar 109A. Similarly, the green or blue intensity of selected images can be modified by moving marker 99B or 99C, respectively. After the desired changes have been made, a user can view the changes by pushing preview button 101A. If the images do not appear as desired, further color changes can be made. When the user is done making color changes, the user can touch "OK" button 101B and window 104 will disappear. If the user touches icon 108K and window 104 appears, but the user then decides not to make any color changes, the user can touch "Cancel" button 101C and window 104 will disappear and no changes will be made to the images.

III. Mechanical Construction of the Scanner

FIG. 10 shows scanner 50 with front and rear covers 60 and 62 removed. Scanner 50 includes film loading platform 64, optical sensors 136, 138, and 140, base 110, left side plate 112, slide plate 114, right side plate 116, motor 120, solenoid 118, S-brackets 122 and 124, light source 80, light shield 126, right rollers 144A, 144B, 144C, and 144D (collectively referred to as right rollers 144), and right guides 150A, 152A, and 154A. Although scanner 50 is shown oriented vertically in FIG. 10, so that film is entered at the top of the scanner and film exits at the bottom of the scanner, scanner 50 may also be oriented horizontally so that film is entered at the front of the scanner and film exits at the back of the scanner.

Left side plate 112 and right side plate 116 are mounted to base 110. Slide plate 114 is slidably mounted between left side plate 112 and right side plate 116. S-bracket 122 is mounted to left side plate 112 and S-bracket 124 is mounted to right side plate 116. Light source 80 (shown with hidden lines) is mounted between S-bracket 122 and S-bracket 124. Light shield 126 is attached to slide plate 114 and helps prevent light from being projected in the space between left side plate 112 and slide plate 114.

Film loading platform 64 is mounted at the upper end of scanner 50. Film loading platform 64 is made up of left platform 64A and right platform 64B. Left platform 64A is mounted to left side plate 112 and right platform 64B is mounted to right side plate 116. Inlet tracks 66 and 68 are formed in film loading platform 64. Inlet track 66 consists of left guide 66A formed in left platform 64A, and right guide 66B formed in right platform 64B. Inlet track 68 consists of left guide 68A formed in left platform 64A, and right guide 68B formed in right platform 64B.

Optical sensors 136, 138, and 140, are attached to film loading platform 64. Optical sensor 136 indicates whether film is located in left guide 66A and optical sensor 138 indicates whether film is located in right guide 66B. Optical sensor 140 indicates whether film is located in right guide 68B. One optical sensor is needed on each side of inlet track 66 because the optical sensors only detect whether film is present at the very edge of the inlet track. Thus, if APS film (which is narrower than 35 mm film) were inserted in inlet track 66, one sensor may indicate that film is present, but the APS film is not wide enough to trigger the other sensor. In contrast, only one optical sensor is needed for the narrower inlet track 68, because 35 mm film is too wide to fit into inlet track 68.

Figure 19:
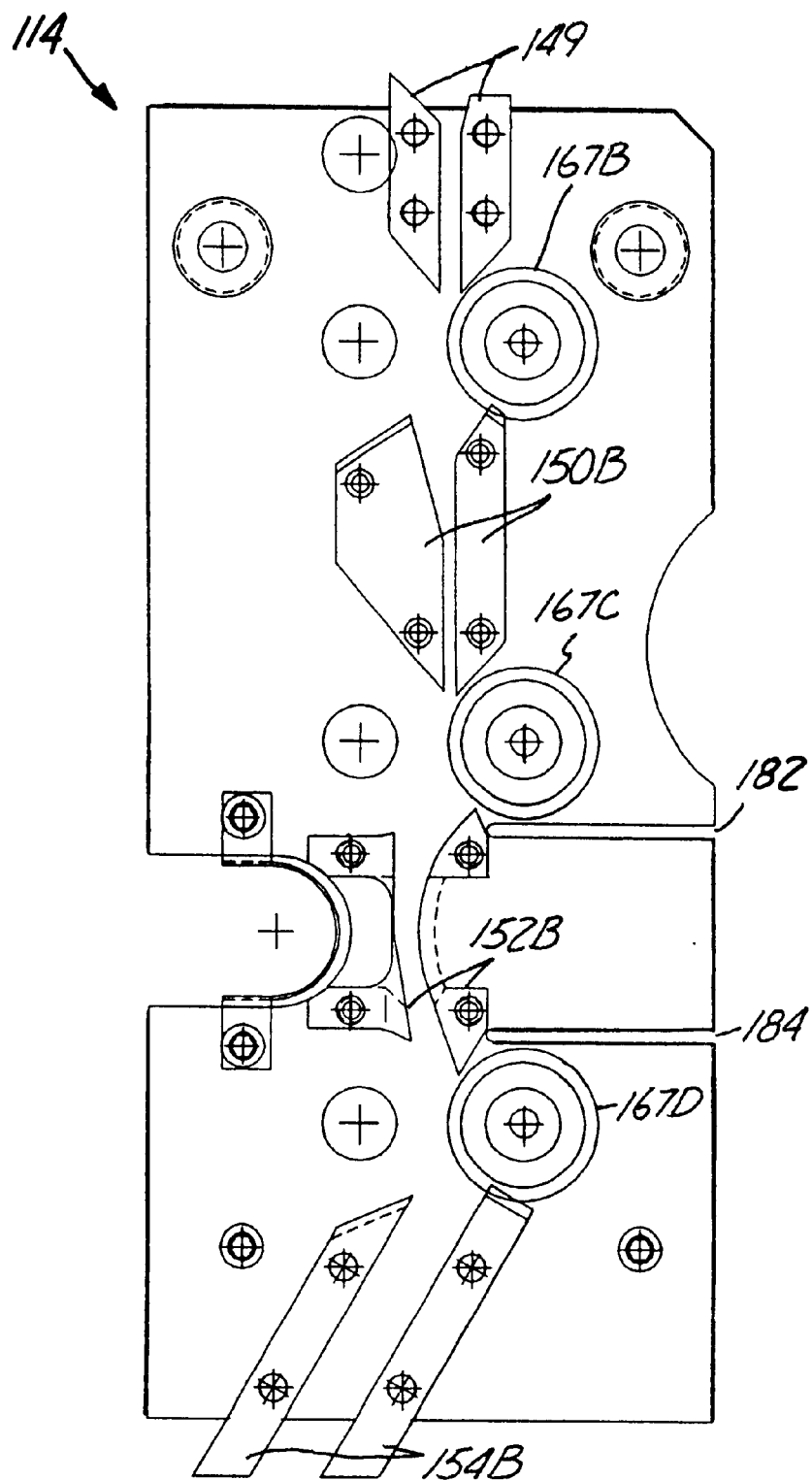
FIG. 19 shows the middle plate of the scanner viewed along section 19—19 of FIG. 12.

After a film strip is entered through one of the inlet tracks, it is guided through scanner 50 by common guide track 76 (the right side of common guide track 76 is shown in FIG. 10, and the left side is shown in FIG. 19). Common guide track 76 is formed by guides 150A, 152A, and 154A (all attached to right side plate 116), and a set of corresponding guides located on slide plate 114 (guides 149, 150B, 152B, and 154B, shown in FIG. 19). The common guide track may also be formed by one continuous guide (rather than three or four separate guides) attached to right side plate 116, and one continuous guide attached to slide plate 114. The width of common guide track 76 is defined by the distance between slide plate 114 and right side plate 116. The width of the common guide track can be adjusted by sliding slide plate 114 between left side plate 112 and right side plate 116. The movement of slide plate 114 is performed by solenoid 118. Solenoid 118 is mounted to left side plate 112. Solenoid 118 also extends through left side plate 112 and is attached to slide plate 114. When optical sensor 140 detects that APS film is present in inlet track 68, solenoid 118 is energized. When solenoid 118 is energized, it pushes slide plate 114 toward right side plate 116 thereby narrowing the common guide track (as shown in FIG. 13). When optical sensors 136 and 138 detect that 35 mm film is present in inlet track 66, solenoid 118 is deenergized. When solenoid 118 is deenergized, slide plate 114 slides back towards left side plate 112 thereby widening the common guide track. In FIG. 10, the solenoid is deenergized so slide plate 114 is located beside left side plate 112. Although only two inlet tracks are shown in FIG. 10, additional inlet tracks can be added to accommodate film of any width. If more than two inlet tracks are used, a linear actuator may be used to adjust the width of the common guide track according to the width of the film being scanned.

Pulleys 142A, 142B, 142C, and 142D (collectively referred to as pulleys 142) are rotatably mounted on right side plate 116. Right rollers 144 are also rotatably mounted on right side plate 116. Directly across from right rollers 144B, 144C, and 144D (but not visible in FIG. 10) are left rollers 164B, 164C, and 164D (which are best shown in FIGS. 12 and 16, and are collectively referred to as left rollers 164). Left rollers 164 are rotatably mounted against slide plate 114 (as shown in FIG. 12). Shafts 156A, 156B, 156C, and 156D (collectively referred to as shafts 156) extend from pulleys 142, through right rollers 144, and through left rollers 164. Motor 120 is mounted to left side plate 112 and drives the pulleys, shafts, and rollers. Motor 120, pulleys 142, shafts 156, right rollers 144, and left rollers 164, make up film drive 88 which is shown in block form in FIG. 4. The operation of film drive 88 will be described in more detail in the discussion of FIG. 11 through FIG. 20.

FIG. 11 shows the right side of scanner 50 with cover plates 60 and 62 removed. Back plate 128 is mounted to the back of left side plate 112 and the back of right side plate 116, and it is also mounted to base 110. Circuit boards 130, 132, and 134 are bolted to each other and to back plate 128. Back plate 128 and circuit board 130 make up a portion of lens assembly 186 (shown in FIGS. 21 and 22). Circuit boards 132 and 134 contain a variety of components including A/D converter 92, buffer 94, and controller 96 (shown in FIG. 4).

Pulleys 142 and drive wheel 160 are rotatably mounted to right side plate 116. In operation, motor 120 (shown in FIG. 10) causes drive wheel 160 to rotate at a substantially constant angular velocity. When drive wheel 160 rotates, belt 162 causes pulleys 142 to rotate at the same angular velocity as the drive wheel. Belt guides 143A, 143B, and 143C are rotatably mounted on right side plate 116, and help maintain the proper tension on belt 162. A film strip must be driven through the scanner at a substantially constant velocity because the film is sampled one line at a time and the time between samples is a constant. Thus, if the advancement of the film speeds up or slows down, the space between samples will vary and the resulting image will be blurry.

FIG. 12 shows the front of the scanner with cover plates 60 and 62 removed. Shafts 156 are attached to pulleys 142 and extend therefrom through right side plate 116, through right rollers 144 and left rollers 164, through slide plate 114, and are rotatably mounted to left side plate 112. Right rollers 144 are rotatably mounted to right side plate 116. Left rollers 164 are slidably mounted on shafts 156. Springs 168B, 168C, and 168D (collectively referred to as springs 168) surround shafts 156 and are located between right rollers 144 and left rollers 164. Springs 168 help maintain the proper spacing between right rollers 144 and left rollers 164 by pressing left rollers 164 against slide plate 114. When solenoid 118 is energized and slide plate 114 moves toward right side plate 116, slide plate 114 pushes left rollers 164 toward right rollers 144 and compresses springs 168 (as shown in FIG. 13). When solenoid 118 is deenergized, springs 168 help force left rollers 164 and slide plate 114 back toward left side plate 112.

FIG. 13 shows the front of the scanner with the solenoid energized so that slide plate 114 has slid from left side plate 112 toward right side plate 116. Arms 170 are attached to right side plate 116 and extend outwardly toward slide plate 114. Arms 170 provide a stopping point for slide plate 114. When solenoid 118 is energized, slide plate 114 slides toward right side plate 116 until it comes in contact with arms 170 at which point it can slide no further. When slide plate 114 slides toward right side plate 116, light shield 126 moves along with slide plate 114 and prevents light from being projected through the gap between left side plate 112 and slide plate 114. Light shield 126 helps ensure that the only light reaching light sensor 86 (shown in FIG. 21), is the light projected through a film strip and down light tunnel 82 (shown in FIG. 16). If other light were to reach the light sensor, it would corrupt the digital image of the film.

FIG. 14 shows the backside of the scanner with back plate 128 and circuit boards 130, 132, 134 removed. Upper tunnel plate 178 and lower tunnel plate 180 are attached between left side plate 112 and right side plate 116. Light tunnel 82 is defined by the region below upper tunnel plate 178, above lower tunnel plate 180, and between right side plate 116 and slide plate 114. Thus, the width of the light tunnel gets narrower when slide plate 114 slides toward right side plate 116, and it gets wider when slide plate 114 slides toward left side plate 112.

FIG. 15 shows right side plate 116 viewed from section 15—15 shown in FIG. 12. Right guides 66B and 68B formed in right platform 64B merge together near right roller 144A and right pressure roller 148A. Right pressure rollers 148A, 148B, 148C, and 148D (collectively referred to as right pressure rollers 148) are rotatably mounted on right side plate 116. Right O-rings 146A, 146B, 146C, and 146D (collectively referred to right O-rings 146) surround the outer surface of right rollers 144. Right pressure rollers 148 are in contact with right O-rings 146. When right rollers 144 rotate, the frictional force between right O-rings 146 and right pressure rollers 148 causes right pressure rollers 148 to rotate. Thus, if right rollers 144 are rotating counterclockwise, this will cause right pressure rollers 148 to rotate clockwise. When a strip of film is placed between a rotating roller 144 and a rotating pressure roller 148, the edge of the film is squeezed between the pressure roller 148 and the O-ring 146 on the roller 144, and the film is advanced between the roller 144 and the pressure roller 148.

Right guides 150A, 152A, and 154A are attached to right side plate 116, and guide the film into and out of right rollers 144 and right pressure rollers 148. Guide roller 174 is rotatably mounted on right side plate 116. Guide plate 172 is mounted on right side plate 116 above right pressure roller 148C. Guide roller 174 and guide plate 172 extend out approximately one inch from right side plate 116 and guide the middle portion, or image portion, of the film into right guide 152A (and into a corresponding left guide 152B shown in FIG. 19). Guide roller 174 and guide plate 172 push against the image portion of the film so as to help eliminate any transverse curvature in the film. Guide roller 174, guide plate 172, and right guide 152A, bend the film longitudinally in a C-shape, with the opening of the "C" facing away from opening 81. This longitudinal bending of the film helps eliminate any transverse bending and provides for a clearer scan of the film.

Optical sensor 141 is mounted at the bottom of right side plate 116 over pressure roller 148D by optical sensor mount 228. Optical sensor 141 detects whether film is in the bottom of the scanner. If a roll of 35 mm film is being scanned and the user attempts to enter a roll of APS film, optical sensor 141 will detect that the 35 mm film is still in the scanner and slide plate 114 will not be allowed to slide until the 35 mm film has exited scanner 50.

FIG. 16 shows a perspective view of right side plate 116. Spacers 171A, 171B, 171C, 171D, and 171E (collectively referred to as spacers 171) are attached at one end to right side plate 116 and, when the scanner is assembled, the other end of the spacers are attached to left side plate 112 (shown in FIG. 10). O-ring 176 surrounds the outer surface of guide roller 174 and helps protect the image portion of the film when it comes in contact with the guide roller. Tunnel plates 178 and 180 are attached to right side plate 116 and extend out therefrom forming the upper and lower boundaries of light tunnel 82. The right boundary of light tunnel 82 is defined by right side plate 116. The left boundary of light tunnel 82 is defined by slide plate 114 (shown in FIG. 19). The left boundary of light tunnel 82 is adjustable and is dependent on the position of slide plate 114. In FIG. 16, two left boundaries are shown with hidden lines. One left boundary is at a distance A from right side plate 116, and the other is at a distance B from right side plate 116.

Shafts 156 extend through the inner surface of left rollers 164. The inner surface of left rollers 164 is hexagonally shaped. Shafts 156 have a circular cross-section near the ends of the shafts, and have a hex portion 159 towards the middle of the shafts which is hexagonal in cross section. The hexagonal outer surface of shafts 156 and the hexagonal inner surface of left rollers 164 are spaced enough to allow left rollers 164 to slide along shafts 156, but the spacing between these surfaces is small enough so that when the shafts rotate, the outer surface of the shafts come in contact with the inner surface of the rollers causing the rollers to rotate. Left O-rings 166B, 166C, and 166D (collectively referred to as left O-rings 166) surround the outer surface of left rollers 164.

Right pressure rollers 148 and right O-rings 146 extend out only about an eighth of an inch from the surface of right side plate 116. Thus only the outer edge of the film is squeezed between right O-rings 146 and right pressure rollers 148. This prevents damage to the middle of the film where the images are located. Similarly, guides 150A, 152A, and 154A also extend out only about an eighth of an inch from right side plate 116 so that only the edge of the film is touched by the guides. Preferably, guide 152A is made of a transparent material so that light can be projected through the guide 152A and through the outer edge of a film strip, thereby allowing the entire width of the film strip to be scanned. Also, guide 152A has openings 232A and 232B to facilitate scanning the outer edge of a film strip.

FIG. 17 is an assembly drawing of right side plate 116. Shafts 156 have a circular cross-section except at hex portion 159 where the cross-section is hexagonal. Each of right rollers 144 has groove 145 surrounding the outer surface of the roller. When assembled, right O-rings 146 are placed in groove 145 of right rollers 144 (as shown in FIG. 18). Sensor holder 138H holds sensor 138 (shown in FIG. 10), and sensor holder 140H holds sensor 140 (shown in FIG. 10). Pads 173 are attached to the end of arms 170 and provide a cushioned surface for slide plate 114 (shown in FIG. 10) to bump into when slide plate 114 slides toward right side plate 116. When assembled, idler pivot 212, roller idler 214A, and pin 216A make up belt guide 143A (shown in FIG. 11). When assembled, idler arm 218, roller idler 214B, spacer 220, and pin 216B make up belt guide 143C (shown in FIG. 11). Socket 217 is attached to S-bracket 124. The various elements are attached to right side plate 116 by fasteners 219.

FIG. 18 shows an assembled pulley, shaft, and roller. Shaft 156 extends through right roller 144, through right side plate 116, through bearing 147, and is attached to pulley 142. Pulley 142 is pressed against bearing 147. Right roller 144 is attached to shaft 156 on the right side of hex portion 159.

FIG. 19 shows slide plate 114 viewed from section 19—19 shown in FIG. 12. Left pressure rollers 167 are rotatably mounted on the slide plate. When assembled, left rollers 164 (shown in FIG. 16) are pressed against slide plate 114 adjacent to left pressure rollers 167. When assembled, left pressure rollers 167 are in contact with left O-rings 166 surrounding left rollers 164. Thus, just as one edge of the film is squeezed between right pressure rollers 148 and right O-rings 146 on right rollers 144, the other edge of the film is squeezed between left pressure rollers 167 and left O-rings 166 on left rollers 164, and the film is advanced when left rollers 164 and left pressure rollers 167 rotate. Left guides 149, 150B, 152B, and 154B, are attached to slide plate 114, and guide the film into and out of left rollers 164 and left pressure rollers 167. When assembled, upper tunnel plate 178 (shown in FIG. 16) is located within upper slit 182 of slide plate 114, and lower tunnel plate 180 (also shown in FIG. 16) is located within lower slit 184 of slide plate 114. There is a loose fit between the tunnel plates and the slits so that slide plate 114 is free to slide back and forth between left side plate 112 and right side plate 116 (shown in FIG. 10).

Figure 20:
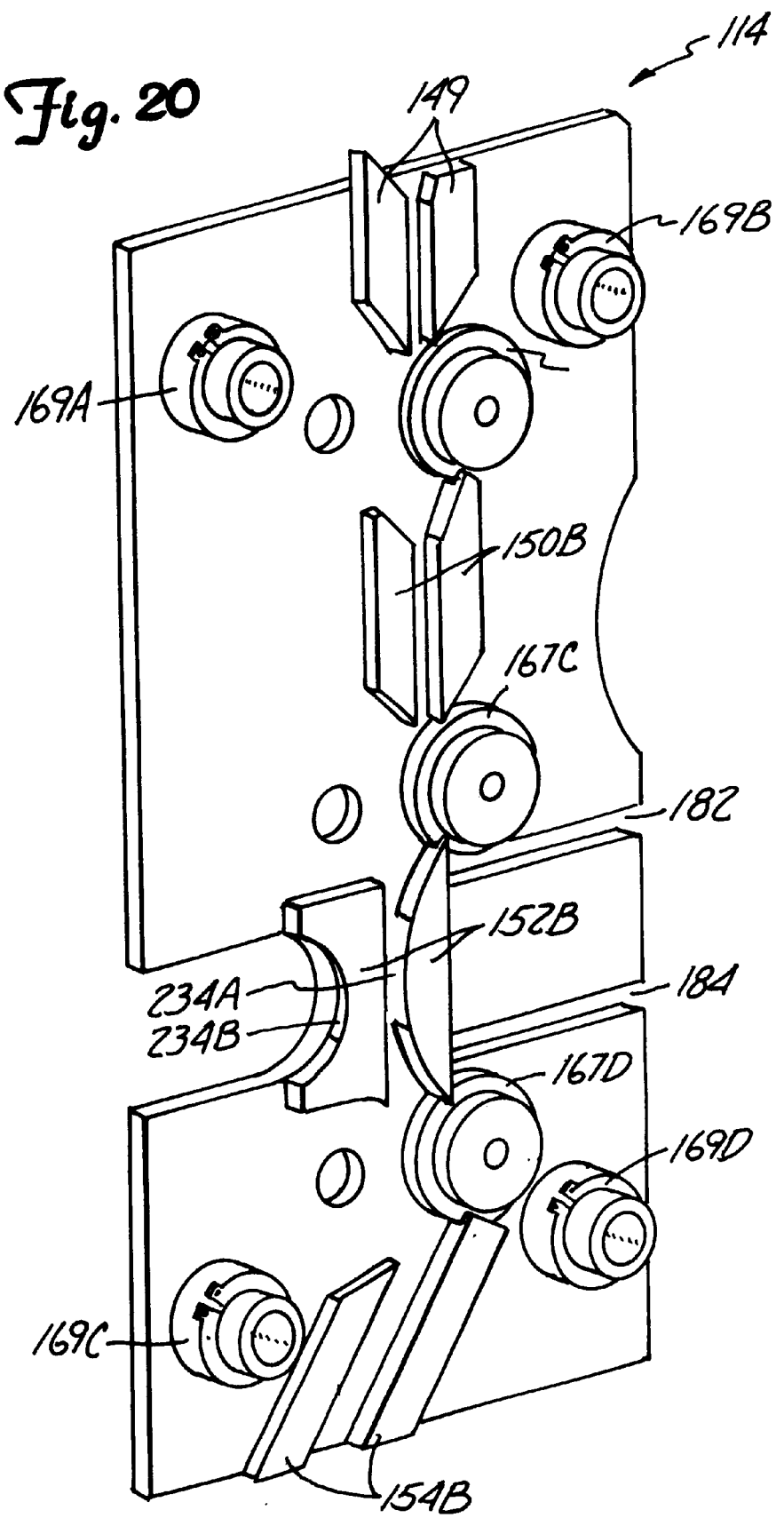
FIG. 20 shows a perspective view of the slide plate of the scanner.

FIG. 20 shows a perspective view of slide plate 114. Left Guides 149, 150B, 152B, and 154B extend out only about an eighth of an inch from slide plate 114 so that only the edges of a film strip come in contact with the guides. Preferably, guide 152B is made of a transparent material so that light can be projected through guide 152B and through the outer edge of a film strip, thereby allowing the entire width of the film strip to be scanned. Also, guide 152B has openings 234A and 234B to facilitate scanning of the outer edge of a film. Bearings 169A, 169B, 169C, and 169D, extend out from slide plate 114. Although there are four bearings shown in FIG. 20, the slide plate may also be used with only two bearings, particularly, bearings 169A and 169B. When assembled, spacers 171A, 171B, 171C, and 171D (shown in FIG. 16 attached to right side plate 116), extend through bearings 169A, 169B, 169C, 169D.

In summary, film 56 is inserted either in inlet track 66 or inlet track 68 (as shown in FIG. 2). Optical sensors 136, 138, and 140, which are mounted on film loading platform 64 (as shown in FIG. 10), detect which inlet track contains film 56. Scanner 50 has a common guide track 76 which consists of right guides 150A, 152A, and 154A, mounted to right side plate 116 (as shown in FIG. 15), and left guides 149, 150B, 152B, and 154B, mounted to slide plate 114 (as shown in FIG. 19). The width of common guide track 76 is defined as the distance between slide plate 114, and right side plate 116. Solenoid 118 (shown in FIG. 10) adjusts the width of common guide track 76 by causing slide plate 114 to slide between left side plate 112 and right side plate 116. If optical sensors 136 and 138 detect that film was inserted in inlet track 66, solenoid 118 adjusts the width of common guide track 76 so that it is the same as the width of inlet track 66. If optical sensor 140 detects that film was inserted in inlet track 68, solenoid 118 adjusts the width of common guide track 76 so that it is the same as the width of inlet track 68. After the width of the common guide track has been adjusted, light source 80 (shown in FIG. 10) is turned on, and film drive 88 (shown in block form in FIG. 4) drives the film through the common guide track. Film drive 88 includes motor 120 (shown in FIG. 10), right rollers 144 (shown in FIG. 15), right pressure rollers 148 (shown in FIG. 15), left rollers 164 (shown in FIG. 16) and left pressure rollers 167 (shown in FIG. 19). The right edge of film 56 is squeezed between right rollers 144 and right pressure rollers 148, and the left edge of film 56 is squeezed between left rollers 164 and left pressure rollers 167. Motor 120 causes right rollers 144, right pressure rollers 148, left rollers 164, and left pressure rollers 167 to rotate, and thereby advance film 56 through common guide track 76. When film 56 advances towards right guide 152A (shown in FIG. 15) and left guide 152B (shown in FIG. 19), light source 80 (shown in FIG. 10) projects light through film 56 and down light tunnel 82 (shown in FIG. 16). At the end of light tunnel 82 is lens assembly 186 which is discussed below.

IV. Lens Assembly

FIG. 21 shows an exploded perspective view of lens assembly 186. Light sensor 86 is mounted on circuit board 130. Spacer 188 is located above light sensor 86. Spacer 188 has groove 190 and opening 192. An infrared light filter 230 (not shown) is located within opening 192 of spacer 188. The infrared light filter prevents infrared light from getting through to light sensor 86. Lens 84 is contained within lens holder 196. The lens and the lens holder fit within groove 190 of spacer 188. Spacer 188 serves three important functions: It provides the necessary spacing between the lens and the light sensor, it filters out infrared light, and the raised edges 194 of the spacer serve as a light tunnel so that the only light entering opening 192 is the light passing through the lens 84. Spacer 188, lens 84, and lens holder 196, are clamped to circuit board 130 by clamp 198. Clamp 198 has front face 200 and opening 202.

Circuit board 130 may mounted to back plate 128 either by nuts and bolts as shown in FIG. 11, or as shown in FIG. 21 by spacers 206 and 207, washers 208, and fasteners 209. When assembled, springs 210 surround spacers 206. When spacers 206 are inserted into circuit board 130, springs 210 are compressed and exert a force against circuit board 130. The distance between light sensor 86 and lens 84 is a critical dimension and must be maintained constant to ensure proper focus. Using spacer 207 and providing a force against circuit board 130 using springs 210 compensates for warping of circuit board 130 and for manufacturing tolerances of the various components and helps to maintain this critical dimension constant.

FIG. 22 shows an assembled lens assembly 186. Back plate 128 of the lens assembly is mounted to the back of the scanner (as shown in FIG. 11). Window 204 of back plate 128 is aligned with light tunnel 82 (shown in FIG. 16) of the film scanner.

V. Adjustable Scanning Resolution

Figure 23A:
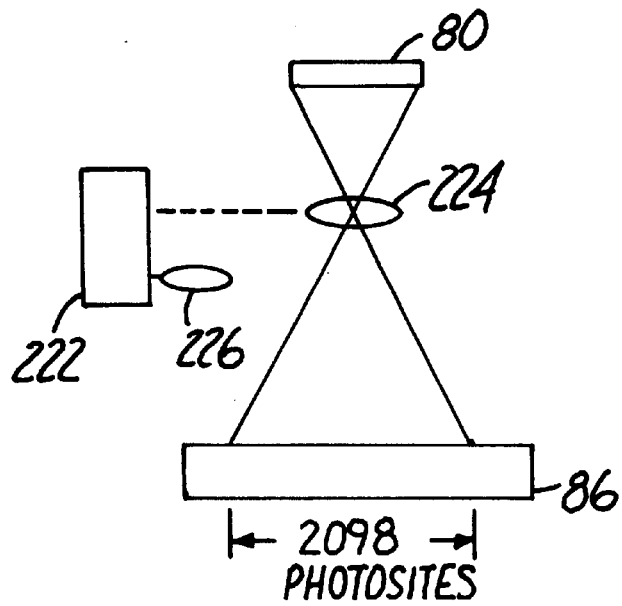
FIGS. 23A–23B show the adjustable resolution feature of the scanner.
Figure 23B:
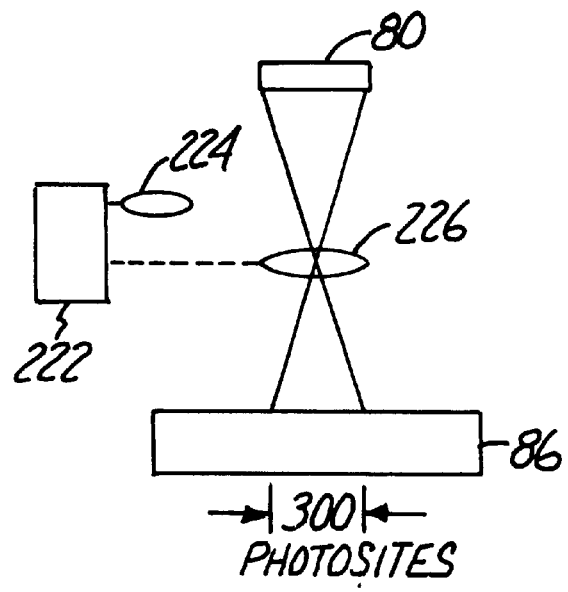

In one preferred embodiment, the scanning resolution is adjustable. The resolution is determined by how many photosites on light sensor 86 are utilized. Typically, the lens focuses the film image on a subset of the photosites such as the 300 photosites in the middle of each array. However, different lenses can be used to focus the film image on any desired number of photosites. Thus, as shown in FIG. 23A and FIG. 23B, adjustable resolution is obtained by using multiple lenses (lens 224 and lens 226) along with actuator 222 to switch the desired lens into place. In FIG. 23A, actuator 222 has moved lens 224 into place, and light source 80 is shown projecting light through lens 224. Lens 224 focuses the light on 2098 photosites of light sensor 86. In FIG. 23B, actuator 222 has moved lens 226 into place, and light source 80 is shown projecting light through lens 226. Lens 226 focuses the light on 300 photosites of light sensor 86. The desired resolution can be chosen either through a switch on the scanner or it can be entered with a software command.

An alternative method of obtaining adjustable resolution, is to first focus the film image on a set of photosites, and this number of photosites would determine the maximum resolution. Lower resolution images would then be obtained by using the output of only a subset of the photosites. For example, the output of every other photosite, or the output of every third photosite, would be used to create lower resolution images.

Another aspect of the adjustable resolution feature is that a film strip can be quickly scanned at a low resolution, and then the scanner can find selected images on the film strip and rescan them at a higher resolution. This is accomplished by first scanning a film strip at a low resolution. The end of the film strip is then retained in the scanner and is held between right roller 144D and right pressure roller 148D (shown in FIG. 16), and between left roller 164D and left pressure roller 167D (shown in FIGS. 16 and 19). The digital images are examined to determine which images should be scanned at a higher resolution, and these images are selected to be rescanned. The direction of rotation of the rollers is then reversed and the film strip is brought back into the scanner. The location of each image was determined and stored during the initial scan, so when the scanner pulls the film strip back into the scanner, it is able to rescan only the selected images at a higher resolution.

VI. DX Code Detection

In another preferred embodiment, the pixel data representing the outer edges of the film strip is examined to obtain the DX-Code or other coded data. The outer edges of a film strip typically contain a series of symbols which provide information about the film such as frame numbers, aspect ratios, and the value of gamma for the film. A pattern matching algorithm analyzes the pixel data representing the outer edges of the film strip and locates all coded data. The pattern matching algorithm then compares the images of the coded data to stored images of coded data to determine which codes are present. Various adjustments are then made to the digital images in accordance with the coded data. For example, the frame numbers can be obtained from the coded data and displayed along with the digital images. The digital images can be adjusted based on the aspect ratios contained in the coded data. Also, the location and orientation of the coded data will indicate the direction that the film was inserted in the scanner, and this information is then used in determining which direction an image must be rotated before being displayed.

Although the present invention has been described with reference to preferred embodiments, workers skilled in the art will recognize that changes may be made in form and detail without departing from the spirit and scope of the invention.

What is claimed is:

1. A scanner for generating pixel data from a photographic film, the scanner comprising:

multiple inlet tracks, each inlet track adapted to receive a photographic film, the inlet tracks merging together at a common point;

an outlet through which the film exits the scanner;

a common guide track located between the common point and the outlet, the common guide track for guiding the film from the common point to the outlet;

a drive mechanism for continuously advancing the film through the common guide track;

a light source for projecting light through the film; and a light sensor for sensing the light projected through the film and for generating pixel data based upon the intensity of the light sensed.

2. A scanner as claimed in claim 1 wherein the common guide track includes a left guide to guide a first edge of the film, a right guide to guide a second edge of the film, and means for adjusting the distance between the left guide and the right guide.

3. A scanner as claimed in claim 2 wherein the left guide and the right guide come in contact only with the edges of the film and do not come in contact with any photographic images on the film.

4. A scanner as claimed in claim 2 wherein each inlet track includes a sensor to detect if film is present in the inlet track, and wherein the distance between the left guide and the right guide is adjusted based upon signals output by the sensors.

5. A scanner as claimed in claim 1 further comprising a light tunnel located between the light source and the light sensor, the light tunnel preventing substantially all light from reaching the light sensor except the light projected through the film strip.

6. A scanner as claimed in claim 5 further comprising means for adjusting the size of the light tunnel.

7. A scanner as claimed in claim 1 wherein the scanner includes a sensor located adjacent to the outlet, the sensor indicating whether film is in the outlet of the scanner.

\* \* \* \* \*